US006864861B2

(12) United States Patent
Schehrer et al.

(10) Patent No.: US 6,864,861 B2
(45) Date of Patent: *Mar. 8, 2005

(54) IMAGE GENERATOR HAVING A MINIATURE DISPLAY DEVICE

(75) Inventors: Kevin Schehrer, Boulder, CO (US); William Cassarly, Lyndhurst, OH (US); Douglas McKnight, Boulder, CO (US); Russell M. Hudyma, San Ramon, CA (US); Jonathan Biles, Vancouver, WA (US); Miller Schuck, Nederland, CO (US); Karl Armagost, Boulder, CO (US)

(73) Assignee: Brillian Corporation, Tempe, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 523 days.

(21) Appl. No.: 09/222,230

(22) Filed: Dec. 29, 1998

(65) Prior Publication Data

US 2002/0003508 A1 Jan. 10, 2002

Related U.S. Application Data

(60) Provisional application No. 60/070,216, filed on Dec. 31, 1997.

(51) Int. Cl.[7] .................................................. G09G 5/00
(52) U.S. Cl. .......................................... 345/7; 359/630
(58) Field of Search ................................ 345/7–9, 100; 359/629–640

(56) References Cited

U.S. PATENT DOCUMENTS

| 3,610,729 A | 10/1971 | Rogers ........................ 350/157 |
| 5,361,151 A | 11/1994 | Sonehara et al. ............. 359/65 |
| 5,426,526 A | 6/1995 | Yamamoto et al. ........... 359/82 |
| 5,440,197 A | 8/1995 | Gleckman .................... 313/110 |
| 5,541,745 A | 7/1996 | Fergason ..................... 359/37 |

(List continued on next page.)

FOREIGN PATENT DOCUMENTS

| JP | 05165051 A | * 6/1993 | ........... G02F/1/135 |
| WO | WO 95/17692 | 6/1995 | |
| WO | WO 97/01774 | 1/1997 | |

OTHER PUBLICATIONS

J. Glueck, et al., "Color–TV projection with fast–switching reflective HAN–mode light valves," SID '92 Digest of Technical Papers, 277–280 (1992).
T. Sonehara, et al., "A new twisted nematic ECB (TN–ECB) mode for a reflective light valve," Japan Display '89, 192–195 (1989).
3M Brightness Enhancement Film (BEF) II (1997).
3M Transmissive Right Angle Film (TRAF) II (1996).
3M Dual Brightness Enhancement Film (DBEF) (1996).
3M Image Directing Film (IDF) II (1996).
PCT International Search Report for PCT Application # PCT/US98/27833, mailed Apr. 15, 1999.
*Head–Mounted Displays* by James E. Melzer and Kirk Moffitt, McGraw–Hill (1997), copy of cover, publication page and Table of Contents (7 pages total).

*Primary Examiner*—Alexander Eisen

(57) ABSTRACT

An image generator having an illuminator, a reflective display device (in one embodiment) and a beamsplitter which produces a virtual image of an image created in a light modulating medium on said reflective display device. In one embodiment, the image generator is a miniature image generator for a relatively small, lightweight head-mounted display which provides a magnified virtual image which is viewed by a viewer. The beamsplitter is optically coupled to the reflective display device. The beamsplitter comprises a film having a plurality of layers including at least a first layer which comprises an oriented birefringent material. The beamsplitter has a wide angle of acceptance.

36 Claims, 24 Drawing Sheets

U.S. PATENT DOCUMENTS

| | | | |
|---|---|---|---|
| 5,566,010 A | 10/1996 | Ishii et al. | 359/59 |
| 5,587,836 A | 12/1996 | Takahashi et al. | 359/630 |
| 5,596,451 A | 1/1997 | Handschy et al. | 359/633 |
| 5,684,354 A | 11/1997 | Gleckman | 313/110 |
| 5,808,800 A * | 9/1998 | Handschy et al. | 359/630 |
| 5,822,292 A | 10/1998 | Akutsu et al. | 369/112 |
| 5,825,542 A * | 10/1998 | Cobb, Jr. et al. | 359/487 |
| 5,962,114 A | 10/1999 | Jonza et al. | |
| 6,023,253 A * | 2/2000 | Taniguchi et al. | 345/7 |
| 6,057,966 A * | 5/2000 | Carroll et al. | 359/630 |
| 6,078,304 A * | 6/2000 | Miyazawa | 345/88 |

* cited by examiner

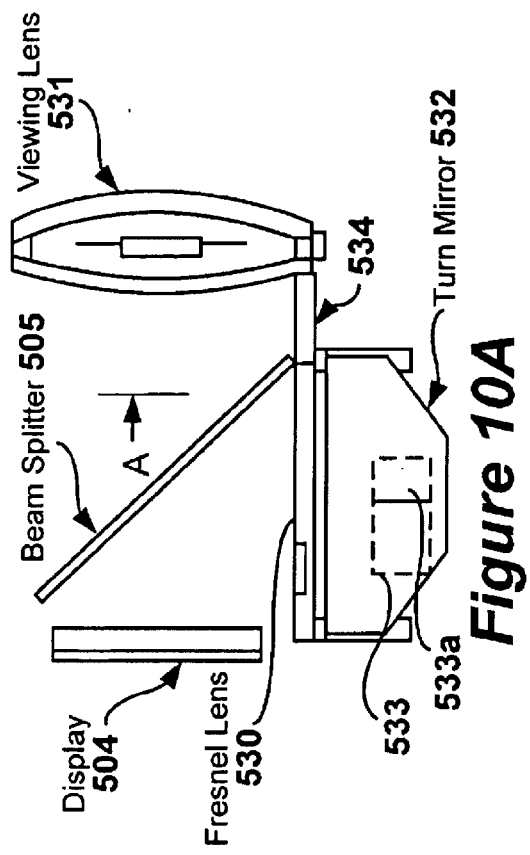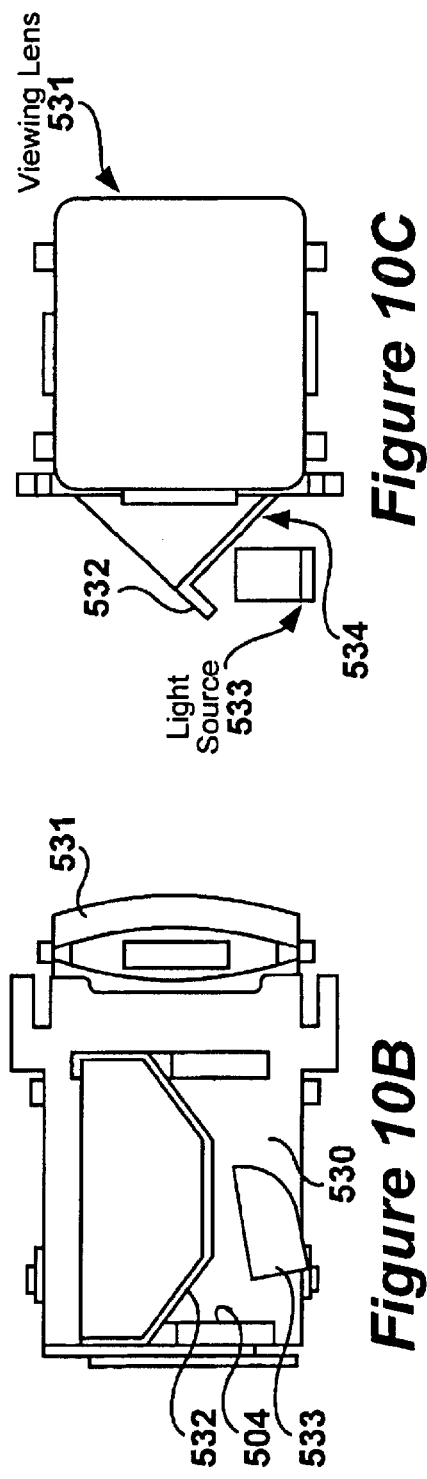

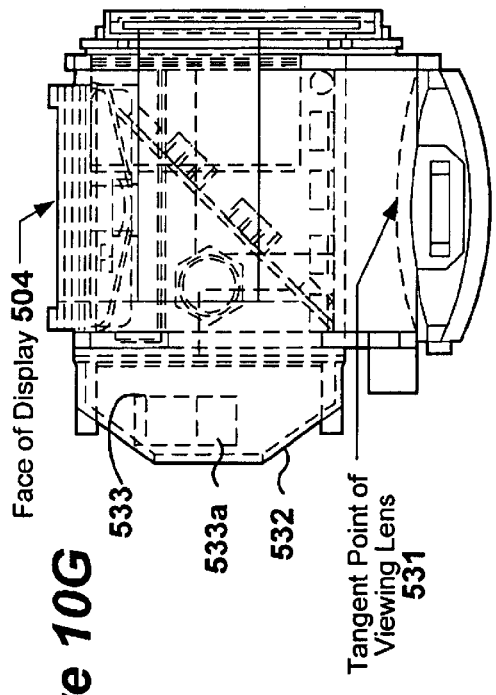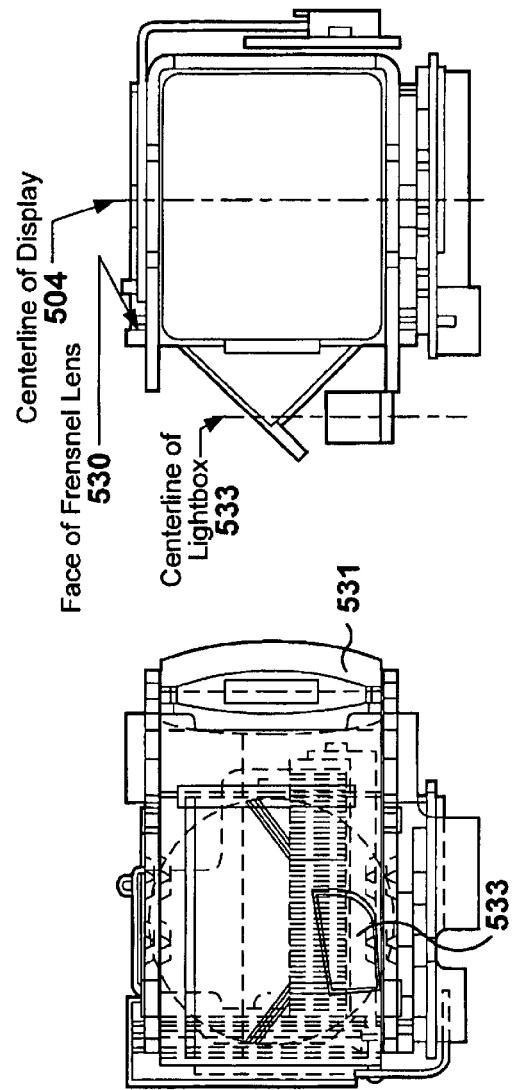

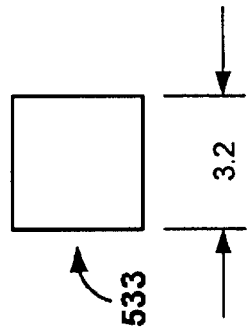
*Figure 11C*
*Figure 11B*
*Figure 11E*
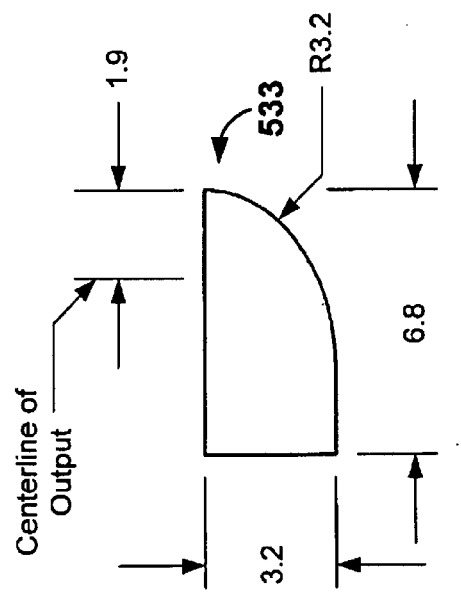
*Figure 11D*

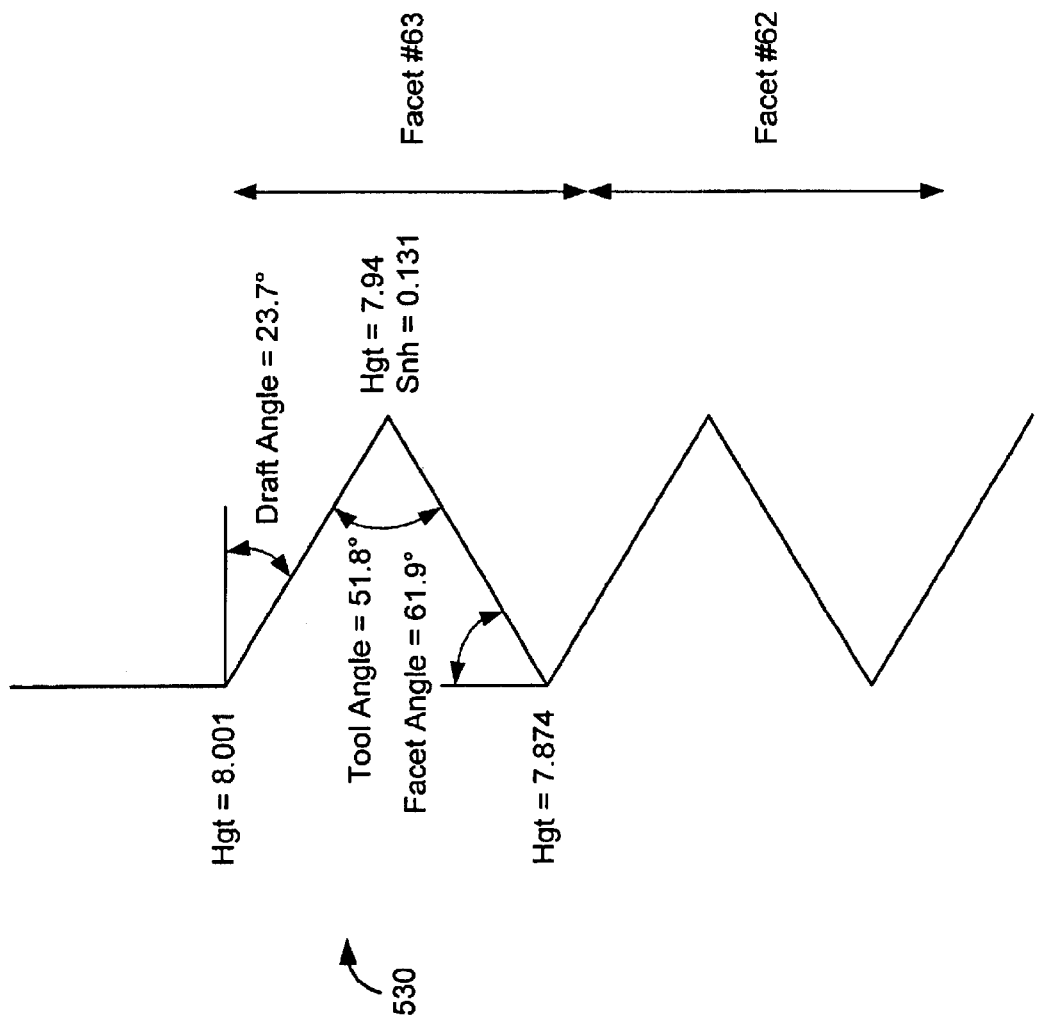

| Facet Number | Draft Angle Used | Facet Angle | 90 - Facet Angle | Tool Angle | Unwrapped Sag | Hgt_1 | Sag_1 | Hgt_2 | Sag_2 |
|---|---|---|---|---|---|---|---|---|---|
| 1 | 5.00 | 0.76 | 89.24 | 94.24 | 0.0000 | 0.000 | 0.000 | 0.12665 | 0.002 |
| 2 | 5.00 | 2.27 | 87.73 | 92.73 | 0.0017 | 0.127 | 0.000 | 0.25356 | 0.005 |
| 3 | 5.00 | 3.79 | 86.21 | 91.21 | 0.0067 | 0.254 | 0.000 | 0.38027 | 0.008 |
| 4 | 5.00 | 5.29 | 84.71 | 89.71 | 0.0151 | 0.381 | 0.000 | 0.50898 | 0.012 |
| 5 | 5.00 | 6.79 | 83.21 | 88.21 | 0.0269 | 0.508 | 0.000 | 0.63369 | 0.015 |
| 6 | 5.00 | 8.29 | 81.71 | 86.21 | 0.0420 | 0.635 | 0.000 | 0.76040 | 0.018 |
| 7 | 5.00 | 9.77 | 80.23 | 85.23 | 0.0605 | 0.762 | 0.000 | 0.89712 | 0.022 |
| 8 | 5.00 | 11.24 | 78.76 | 83.76 | 0.0824 | 0.889 | 0.000 | 1.01383 | 0.025 |
| 9 | 5.00 | 12.70 | 77.30 | 82.30 | 0.1076 | 1.016 | 0.000 | 1.14054 | 0.028 |
| 10 | 5.00 | 14.14 | 75.86 | 80.88 | 0.1362 | 1.143 | 0.000 | 1.26726 | 0.031 |
| 11 | 5.00 | 15.57 | 74.43 | 79.43 | 0.1682 | 1.270 | 0.000 | 1.39398 | 0.035 |
| 12 | 5.00 | 16.98 | 73.02 | 78.02 | 0.2036 | 1.397 | 0.000 | 1.52069 | 0.038 |
| 13 | 5.00 | 18.38 | 71.62 | 76.62 | 0.2424 | 1.524 | 0.000 | 1.64741 | 0.041 |
| 14 | 5.00 | 19.75 | 70.25 | 75.25 | 0.2846 | 1.651 | 0.000 | 1.77413 | 0.044 |
| 15 | 5.00 | 21.10 | 68.90 | 73.90 | 0.3302 | 1.776 | 0.000 | 1.90085 | 0.047 |
| 16 | 5.00 | 22.44 | 67.56 | 72.58 | 0.3792 | 1.905 | 0.000 | 2.02757 | 0.051 |
| 17 | 5.00 | 23.75 | 66.25 | 71.25 | 0.4317 | 2.032 | 0.000 | 2.15429 | 0.054 |
| 18 | 5.00 | 25.03 | 64.97 | 69.97 | 0.4875 | 2.159 | 0.000 | 2.28101 | 0.057 |
| 19 | 5.00 | 26.30 | 63.70 | 68.70 | 0.5466 | 2.266 | 0.000 | 2.40774 | 0.060 |
| 20 | 5.00 | 27.54 | 62.46 | 67.46 | 0.6096 | 2.413 | 0.000 | 2.53446 | 0.063 |
| 21 | 5.00 | 28.76 | 61.24 | 66.24 | 0.6758 | 2.540 | 0.000 | 2.66118 | 0.067 |
| 22 | 5.00 | 29.96 | 60.04 | 65.04 | 0.7456 | 2.667 | 0.000 | 2.78790 | 0.070 |

*Figure 12B*

| Facet Number | Draft Angle Used | Facet Angle | 90 - Facet Angle | Tool Angle | Unwrapped Sag | Hgt_1 | Sag_1 | Hgt_2 | Sag_2 |
|---|---|---|---|---|---|---|---|---|---|
| 23 | 5.00 | 31.13 | 58.67 | 63.87 | 0.8188 | 2.794 | 0.000 | 2.91463 | 0.073 |
| 24 | 5.00 | 32.28 | 57.72 | 62.72 | 0.8955 | 2.921 | 0.000 | 3.04135 | 0.076 |
| 25 | 5.00 | 33.40 | 56.60 | 61.60 | 0.9757 | 3.048 | 0.000 | 3.16607 | 0.079 |
| 26 | 5.00 | 34.50 | 55.50 | 60.50 | 1.0594 | 3.175 | 0.000 | 3.29480 | 0.082 |
| 27 | 5.00 | 35.58 | 54.42 | 59.42 | 1.1467 | 3.302 | 0.000 | 3.42152 | 0.085 |
| 28 | 5.00 | 36.83 | 53.37 | 58.37 | 1.2376 | 3.429 | 0.000 | 3.54824 | 0.089 |
| 29 | 5.27 | 37.66 | 52.34 | 57.60 | 1.3320 | 3.556 | 0.000 | 3.67457 | 0.092 |
| 30 | 5.65 | 38.87 | 51.33 | 56.98 | 1.4300 | 3.683 | 0.000 | 3.80069 | 0.094 |
| 31 | 6.04 | 39.65 | 50.35 | 56.39 | 1.5316 | 3.810 | 0.000 | 3.92675 | 0.097 |
| 32 | 6.45 | 40.62 | 49.36 | 55.83 | 1.6369 | 3.937 | 0.000 | 4.05277 | 0.099 |
| 33 | 6.87 | 41.56 | 48.44 | 55.31 | 1.7458 | 4.084 | 0.000 | 4.17874 | 0.102 |
| 34 | 7.30 | 42.58 | 47.52 | 54.63 | 1.8584 | 4.191 | 0.000 | 4.30466 | 0.104 |
| 35 | 7.75 | 43.38 | 46.62 | 54.37 | 1.9747 | 4.318 | 0.000 | 4.43053 | 0.106 |
| 36 | 8.21 | 44.25 | 45.75 | 53.95 | 2.0947 | 4.445 | 0.000 | 4.55835 | 0.108 |
| 37 | 8.67 | 45.11 | 44.69 | 53.56 | 2.2184 | 4.572 | 0.000 | 4.68213 | 0.111 |
| 38 | 9.15 | 45.95 | 44.05 | 53.20 | 2.3459 | 4.609 | 0.000 | 4.80786 | 0.113 |
| 39 | 9.65 | 46.77 | 43.23 | 52.88 | 2.4772 | 4.826 | 0.000 | 4.93355 | 0.114 |
| 40 | 10.15 | 47.57 | 42.43 | 52.58 | 2.6123 | 4.953 | 0.000 | 5.05920 | 0.116 |
| 41 | 10.66 | 48.35 | 41.65 | 52.31 | 2.7512 | 5.080 | 0.000 | 5.16481 | 0.118 |
| 42 | 11.18 | 49.12 | 40.66 | 52.07 | 2.8941 | 5.207 | 0.000 | 5.31039 | 0.119 |
| 43 | 11.72 | 49.87 | 40.13 | 51.85 | 3.0408 | 5.334 | 0.000 | 5.43593 | 0.121 |
| 44 | 12.26 | 50.60 | 39.40 | 51.66 | 3.1914 | 5.461 | 0.000 | 5.56144 | 0.122 |
| 45 | 12.81 | 51.31 | 38.69 | 51.50 | 3.3460 | 5.588 | 0.000 | 5.68892 | 0.124 |

*Figure 12C*

| Facet Number | Draft Angle Used | Facet Angle | 90 - Facet Angle | Tool Angle | Unwrapped Sag | Hgt_1 | Sag_1 | Hgt_2 | Sag_2 |
|---|---|---|---|---|---|---|---|---|---|
| 46 | 13.37 | 52.01 | 37.99 | 51.36 | 3.5046 | 5.715 | 0.000 | 5.81237 | 0.125 |
| 47 | 13.84 | 52.69 | 37.31 | 51.25 | 3.6672 | 5.842 | 0.000 | 5.93780 | 0.126 |
| 48 | 14.51 | 53.36 | 36.64 | 51.15 | 3.8338 | 5.969 | 0.000 | 6.06321 | 0.127 |
| 49 | 15.10 | 54.02 | 35.98 | 51.08 | 4.0046 | 6.096 | 0.000 | 6.18860 | 0.128 |
| 50 | 15.68 | 54.68 | 35.34 | 51.03 | 4.1795 | 6.223 | 0.000 | 6.31398 | 0.128 |
| 51 | 16.28 | 55.28 | 34.72 | 51.00 | 4.3586 | 6.350 | 0.000 | 6.43935 | 0.129 |
| 52 | 16.88 | 55.89 | 34.11 | 50.98 | 4.5419 | 6.477 | 0.000 | 6.56470 | 0.130 |
| 53 | 17.48 | 56.49 | 33.51 | 50.99 | 4.7294 | 6.604 | 0.000 | 6.69005 | 0.130 |
| 54 | 18.09 | 57.08 | 32.92 | 51.01 | 4.9212 | 6.731 | 0.000 | 6.81540 | 0.130 |
| 55 | 18.71 | 57.66 | 32.34 | 51.05 | 5.1174 | 6.858 | 0.000 | 6.94075 | 0.131 |
| 56 | 19.32 | 58.22 | 31.78 | 51.10 | 5.3180 | 6.985 | 0.000 | 7.06610 | 0.131 |
| 57 | 19.94 | 58.78 | 31.22 | 51.17 | 5.5230 | 7.112 | 0.000 | 7.19145 | 0.131 |
| 58 | 20.56 | 59.32 | 30.68 | 51.24 | 5.7325 | 7.239 | 0.000 | 7.31681 | 0.131 |
| 59 | 21.18 | 59.85 | 30.15 | 51.33 | 5.9465 | 7.366 | 0.000 | 7.44218 | 0.131 |
| 60 | 21.81 | 60.37 | 29.63 | 51.44 | 6.1652 | 7.493 | 0.000 | 7.58755 | 0.131 |
| 61 | 22.43 | 60.88 | 29.12 | 51.55 | 6.3885 | 7.620 | 0.000 | 7.69295 | 0.131 |
| 62 | 23.05 | 61.38 | 28.62 | 51.67 | 6.6165 | 7.747 | 0.000 | 7.81835 | 0.131 |
| 63 | 23.67 | 61.88 | 28.12 | 51.80 | 6.8493 | 7.874 | 0.000 | 7.94377 | 0.131 |
| 64 | | | | | | 8.001 | 0.000 | | |

*Figure 12D*

Notes:

Dimensions are in millimeters.
Material: Optical grade acrylic, free or striae and inclusions larger than 150 10110 grade 0.4.

Surface quality will be ISO 10110 grade 0.4 or better.

Fresnel surface has 200 grooves per inch and is defined by aspheric equation
SAG $(x)=(h+h/R) / (t+sqrt(1-((t+k)+H+H / (R+R))))$
With R=4.5mm, k=-.92, and h=Height from Optical Axis.

Effective Focal Length=9.7mm ± 0.5x

A clear aperture rectangular region of 10.1mm x 12.4mm.

A flatness of ± 0.003" is acceptable.
The part is dimensioned from the optic center.

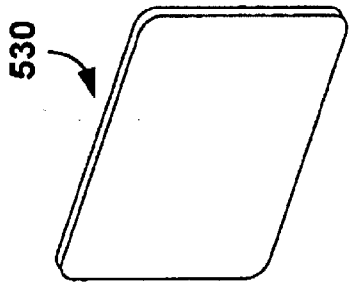

*Figure 12G*

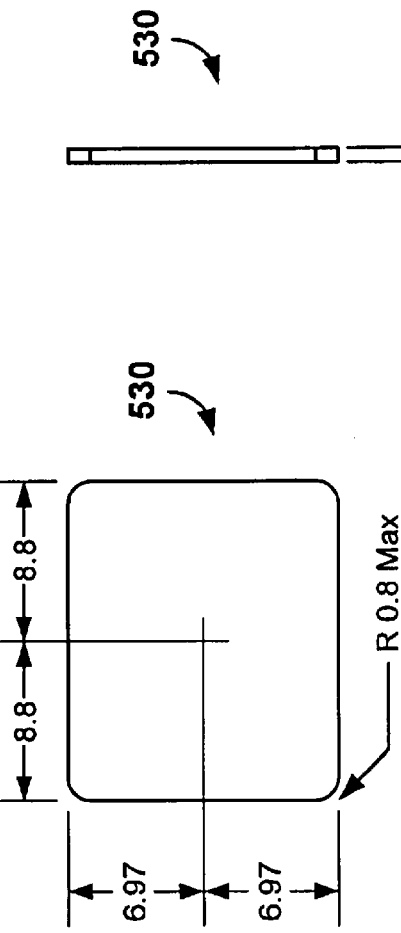

| | | | | | | | | |
|---|---|---|---|---|---|---|---|---|
| S1 | 21.000 CX | TPF | 5.0/1.0 | 15.5 X 12.3 | - | - | 6.000 | ±0.025 | 0.0050 |
| S2 | 30.700 CX | TPF | 5.0/1.0 | 15.5 X 12.3 | - | - | - | - | T.I.R. |

| SAG Table for Base Asphere or Surface 'S1" | |
|---|---|
| Y | ASPH SAG (Z) |
| 0.000 | 0.000000 |
| 1.000 | 0.023813 |
| 2.000 | 0.095303 |
| 3.000 | 0.214615 |
| 4.000 | 0.381995 |
| 5.000 | 0.597791 |
| 6.000 | 0.862456 |
| 7.000 | 1.176554 |
| 8.000 | 1.540766 |
| 9.000 | 1.955897 |
| 10.000 | 2.422883 |
| 11.000 | 2.942810 |
| 12.000 | 3.516919 |
| 13.000 | 4.146627 |
| 14.000 | 4.833546 |

| SAG Table for Base Asphere or Surface 'S2" | |
|---|---|
| Y | ASPH SAG (Z) |
| 0.000 | -0.000000 |
| 1.000 | -0.016260 |
| 2.000 | -0.064719 |
| 3.000 | -0.144448 |
| 4.000 | -0.253995 |
| 5.000 | -0.391596 |
| 6.000 | -0.554865 |
| 7.000 | -0.741823 |
| 8.000 | -0.950118 |
| 9.000 | -1.177552 |
| 10.000 | -1.422059 |
| 11.000 | -1.681735 |
| 12.000 | -1.954854 |
| 13.000 | -2.239873 |
| 14.000 | -2.2535422 |

Notes: Unless otherwise specified
1. Dimensions are in millimeters.
2. Material: Optical grade acrylic. Free of striae and inclusions larger than ISO 10110 grade ½ x 0.4.
3. Surfaces marked 'S1' and 'S2' diamond turn, all others fine grind.
4. Surface quality: ISO 10110 grade 5/2 x 0.4 or better.
5. Bevel edges at 45° to 0.02 max face width.
6. Surface 'S1" is aspheric defined by the equation:

$$Z(y) = \frac{Cy^2}{1+(1-(t+k)C^2y^2)^{1/2}}$$

Where $$C = \frac{1}{R} = \frac{1}{21} \text{ mm}^{-1}$$

$$k = -0.7$$

7. Surface 'S2" is aspheric defined by the equation:

$$Z(y) = \frac{Cy^2}{1+(1-(t+k)C^2y^2)^{1/2}}$$

Where $$C = \frac{1}{R} = \frac{1}{30.7} \text{ mm}^{-1}$$

$$k = -7.273$$

8. Surface marked 'D' has a rotationally symmetric diffractive phase profile which lies atop the base asphere defined in note 8. The OPD is defined by the equation:

$$OPD(R) = CR^2 \quad OR \quad \phi(R) = \frac{2\pi}{\lambda_0} \times CR^2$$

Where $\lambda_0 = 550\text{nm}$ $C = -1.2543 \times 10^{-3} \text{mm}^{-1}$ $R^2 = x^2 + y^2$ 9. Surface marked 'D' shall have the diffraction efficiency maximized at 550mm.

*Figure 13D*

IMAGE GENERATOR HAVING A MINIATURE DISPLAY DEVICE

CROSS-REFERENCE TO RELATED APPLICATION

This continuation-in-part application is related to and claims the benefit, under 35 U.S.C. §119(e), of the filing date of a provisional patent application which is entitled "An Image Generator Having a Miniature Display Device" and which was filed Dec. 31, 1997 as application Ser. No. 60/070,216.

BACKGROUND OF THE INVENTION

The present invention relates generally to visual display systems and more particularly to miniature display devices which use a beamsplitter to generate a magnified virtual image of the image formed by the miniature display device.

Miniature display devices may be used in a number of ways, although they are particularly well suited for use in a head-mounted display. Head-mounted displays which are mounted on the head of a viewer have typically been bulky and large. These displays often use small cathode ray tubes to project an image toward a viewer's eye. Numerous head-mounted displays are known in the art. See, for example, the book *Head-Mounted Displays*, by James E. Melzer, and Kirk Moffitt, which is published by McGraw-Hill. These displays are sometimes also referred to as displays which are brought to the head (of the viewer).

Certain head-mounted displays use a liquid crystal technology to provide a visual display rather than using cathode ray tubes. For example, U.S. Pat. No. 5,596,451 describes a miniature image generator which uses a liquid crystal display device in conjunction with magnifying mirrors to generate an image which may be used with a head-mounted display. Examples of liquid crystal display devices which may be used in this context may be found in U.S. Pat. Nos. 5,566,010 and 5,426,526.

While liquid crystal display devices in head-mounted displays provide certain advantages in terms of the weight and bulk of the resulting display, these displays are often poorly suited to displaying high quality images because of the short optical paths required by a small enclosure which houses the head-mounted display. For example, these displays use conventional beamsplitters which have limited angles of acceptance, which tends to make the display non-uniform across the entire image. Thus, while head-mounted display devices which use liquid crystal displays rather than CRT's are smaller and lighter, they do not provide the performance advantages of CRT's. Thus, it is desirable to provide a head-mounted display which is both lightweight and small and yet provides high quality performance even for color video data at fast frame rates.

SUMMARY OF THE INVENTION

An image generator which is suitable for a head-mounted display is described in this disclosure. In one embodiment, the image generator includes an illuminator, a reflective display device, and a beamsplitter which has a wide angle of acceptance and which produces a virtual image of an image created in a light modulating medium on the reflective display device.

In one particular embodiment, the image generator includes a parallel to serial converter. Various embodiments of optical configurations for various particular embodiments are also described. These various optical configurations allow a magnifying lens to receive an image from a reflective display device, such as a liquid crystal on silicon display device, and to produce a magnified virtual image of the image on the reflective display device.

In one embodiment, the beamsplitter comprises a film having a plurality of layers including at least a first layer which comprises an oriented birefringent material. The beamsplitter in this embodiment polarizes by reflecting light having a first polarity and by transmitting light having a second polarity. The beamsplitter of this embodiment may be formed by stretching the film along a first axis. Typically, a plurality of first layers is arranged with a plurality of second layers to form the film, and each first layer is disposed between two of the second layers. Also typically, each first layer has a higher index of refraction than the index of refraction of each second layer.

In one aspect of the present invention, a miniature display device is constructed with an optical arrangement which includes a fresnel lens which receives light from a light source, such as an integrating cavity, in one example of the present invention. In one particular embodiment of this aspect of the present invention, the light from the light source is directed to a mirror which then reflects the light to and through the fresnel lens. The light directed through the fresnel lens is then directed to a polarizing beamsplitter, such as, in one embodiment, the beamsplitter formed from a plurality of layers in another aspect of the present invention. Polarized light from the polarizing beamsplitter is then directed to a spatial light modulator (SLM) such as a liquid crystal display device, and modulated light from this display device is then directed through the polarizing beamsplitter and through a viewing lens towards the viewer's eye.

In another aspect of the present invention, the light source is tilted relative to other optical elements in order to provide more uniform lighting. In other embodiments of this aspect of the present invention, an alternative optical element may be tilted relative to the other optical elements in the arrangement in order to achieve improved illumination uniformity.

According to yet another aspect of the present invention, the light source of the present invention may employ an integrating cavity which includes an illumination device and several films on an output port of the cavity. These films tend to improve the spatial uniformity of the light outputted from the output port.

In another aspect of the invention, the beamsplitter may comprise a cholesteric-type layered structure.

BRIEF DESCRIPTION OF THE DRAWINGS

The various embodiments of the present invention will be described in detail with reference to the following drawings in which like reference numerals refer to like elements.

FIG. 10A shows a top view of an optical arrangement for a miniature display device which generates an enlarged virtual image.

FIG. 10B shows a left side view of the optical arrangement of FIG. 10A.

FIG. 10C shows a front view of the optical arrangement of FIG. 10A.

FIG. 10G shows another top view of the optical arrangement of FIG. 10A, and in this view of FIG. 10G, numerous additional supporting structure is shown.

FIG. 10H shows a left side view of the miniature display device of FIG. 10G; FIG. 10H in particular shows the tilt of the light box 533.

FIG. 10I shows a front view of the miniature display device shown in FIG. 10G.

FIG. 11B shows a top view of the light source of FIG. 11A.

FIG. 11C shows a perspective view of the light source of FIG. 11A.

FIG. 11D shows a side view of the light source of FIG. 11A.

FIG. 11E shows a back view of the light source of FIG. 11A.

FIG. 12A shows an enlarged view of a particular optical element used according to one aspect of the present invention in the optical arrangement of FIG. 10A.

FIGS. 12B, 12C and 12D provide further detailed information with respect to the design of the optical element 530 shown in FIG. 12A.

FIGS. 12E, 12F and 12G show various views of the optical element 530.

FIG. 13D shows various parameters and information further specifying the viewing lens depicted in FIGS. 13A, 13B and 13C.

DETAILED DESCRIPTION OF PREFERRED EMBODIMENTS OF THE PRESENT INVENTION

The following description provides examples of the present invention. It will be appreciated, however, that other examples of the present invention will become apparent to those in the art upon examination of this description. Thus, the present description and the accompanying drawings are for purposes of illustration and are not to be used to construe the invention in a restrictive manner. It will be appreciated that the present invention relates to a miniature display which uses a beamsplitter as described herein; however, for purposes of explanation, head-mounted displays will often be used in this description as an example of a miniature display.

Figure 1A:
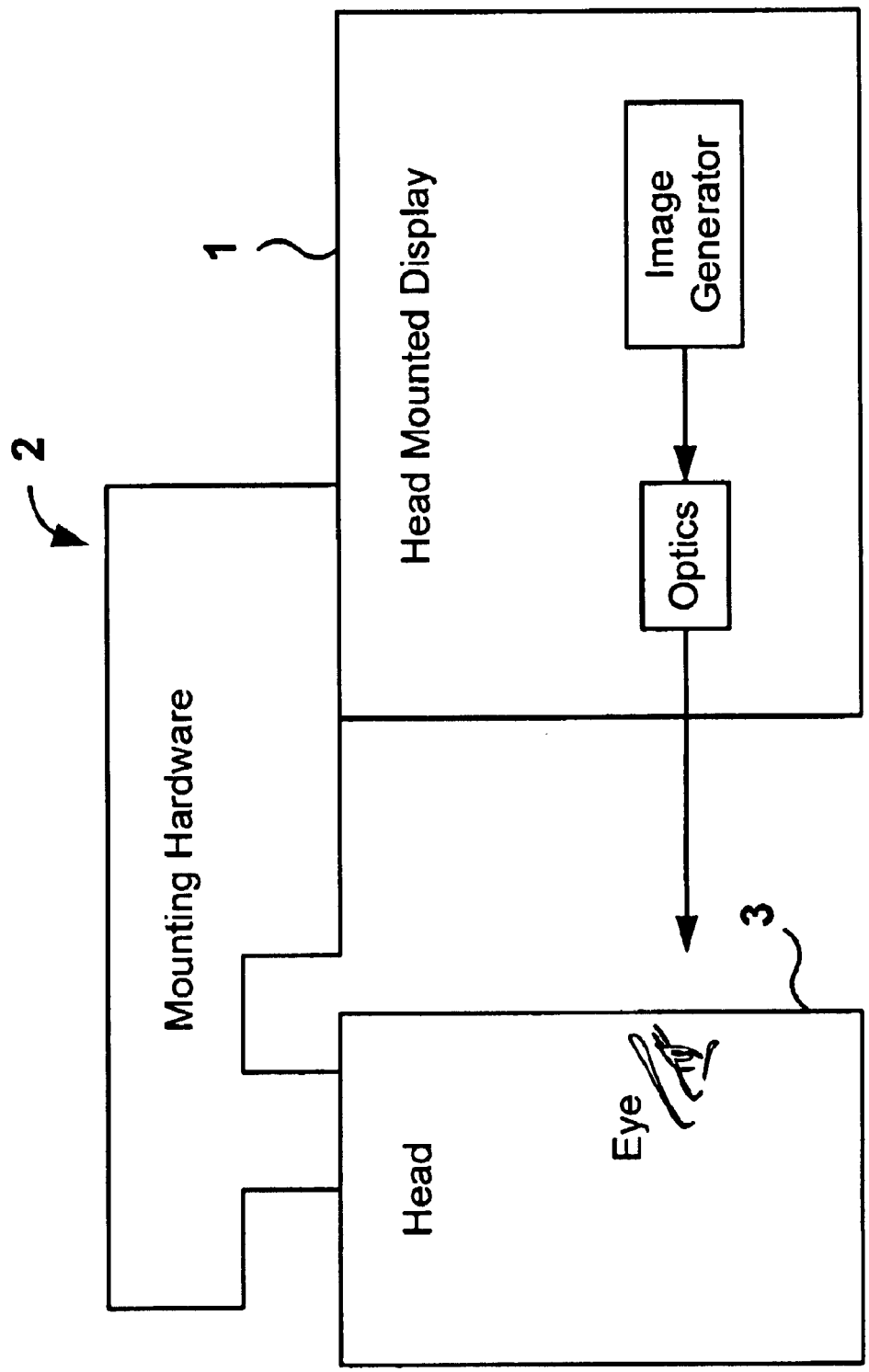
FIG. 1A shows a head-mounted display being worn by a viewer.

FIG. 1A illustrates a head-mounted display 1 which is being worn by a viewer such that the head-mounted display 1 is in close proximity to the eye 3 of the viewer. Mounting hardware 2 may be a helmet which includes a means for adjusting the position of the head-mounted display 1 relative to the eye 3 such that the viewer may comfortably view the image generated by the head-mounted display 1.

Figure 1B:
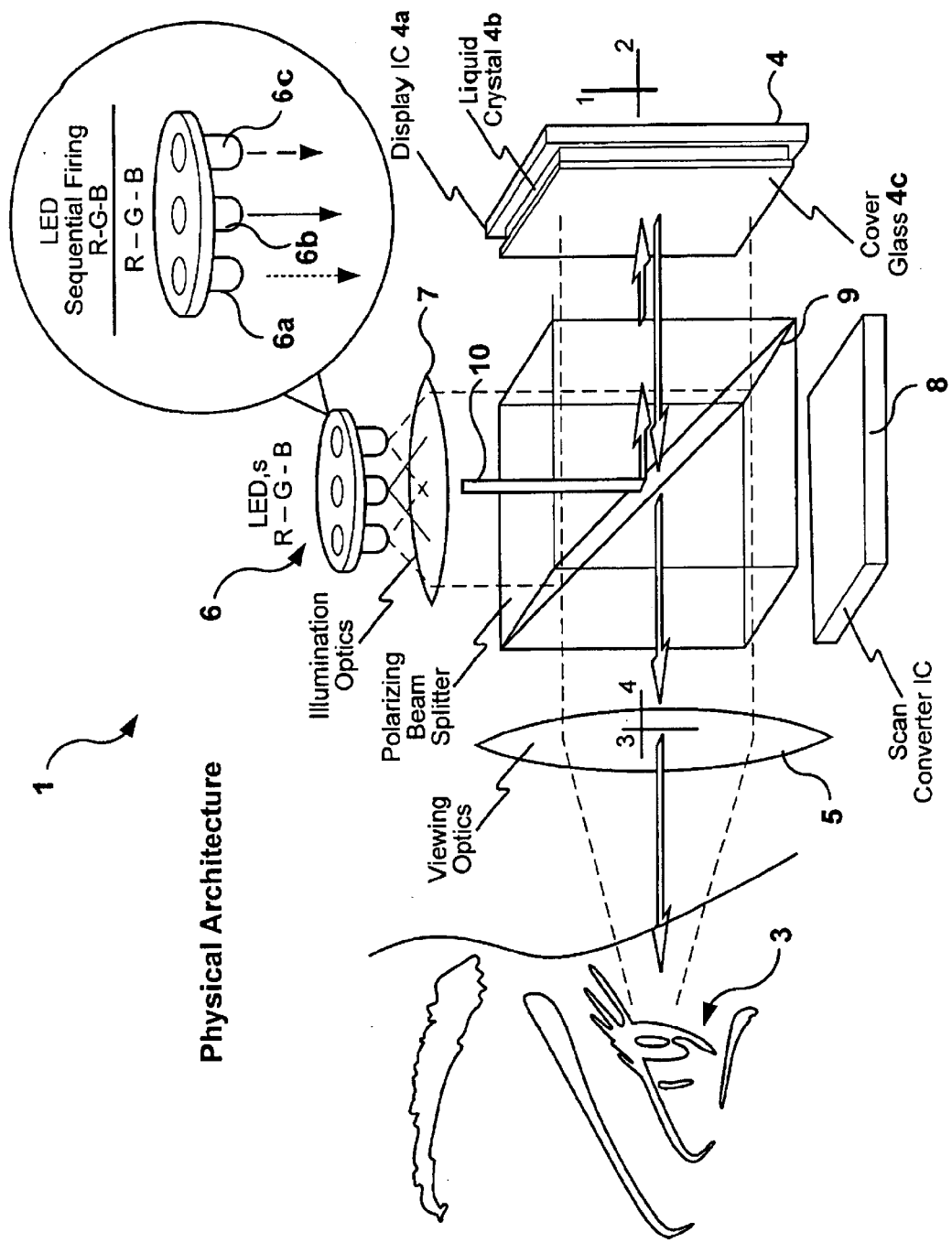
FIG. 1B shows various components of a head-mounted display relative to a viewer's eye.

FIG. 1B shows a particular implementation of a head-mounted display according to one embodiment of the present invention. The various components of the head-mounted display 1 for this particular embodiment include a reflective display device 4 which includes a display integrated circuit 4a, a liquid crystal layer 4b, which is a form of an electro-optic layer, and a cover glass 4c. The viewing optics 5 creates a magnified image of the image created by the liquid crystal layer 4b. The image on the liquid crystal layer 4b is created by sequentially illuminating a red, a green, and a blue LED over time, using the illuminator 6 which includes the three LED's 6a, 6b, and 6c. An illumination optical lens 7 provides the light from the illuminator 6 to a beamsplitter 9 which directs the polarized light toward the liquid crystal layer 4b.

The beamsplitter 9 is a film having multiple layers which include at least one layer which is an oriented birefringent material. In a preferred embodiment, the beamsplitter acts as a reflecting polarizer by reflecting light of one polarity and transmitting light of another polarity, and this beamsplitter provides this functionality over a wide angle of incidence. That is, light at a perpendicular incidence (90°) will be polarized in substantially the same manner as light having an angle of incidence of substantially less that 90° (e.g. 30° angle of incidence). This property is referred to as a wide angle of acceptance. In a preferred embodiment, the beamsplitter has a plurality of first layers which are each an oriented birefringent polymer (e.g. crystalline naphthalene dicarboxylic acid polyester) having an average thickness of less than 0.5 microns. The beamsplitter also includes a plurality of second layers each of which is polymer (e.g. a polyester or a polystyrene or a polyacrylate or a polymethacrylate or a polymethylmethylacrylate or a polyolefin) and has an average thickness of less than 0.5 micron. The plurality of first and second layers form an interdigitated stack of layers such that a first layer will be adjacent to a second layer on one plane surface of the first layer and will be adjacent to another second layer on another plane surface of the first layer. This is shown in both FIGS. 5 and 6. A polarizing beamsplitter may be formed by stretching a film, containing both the first and second layers, uniaxially (along a first axis) by a first dimension which is at least twice a second dimension of the film along a second axis, where the first axis is generally orthogonal to the second axis. In this case, the first layers have a higher index of refraction (associated with at least one axis in the plane of the film)than an index of refraction of the second layers. The film may be mounted on a frame or may be applied to a glass plate which supports the film. Further description of the beamsplitter is provided below.

The polarized light from the beamsplitter 9 is directed through the liquid crystal layer 4b toward the reflective pixel electrodes on the display integrated circuit 4a and is reflected from these electrodes back through the liquid crystal layer 4b and towards the beamsplitter 9. The spatial state of the various areas of the liquid crystal layer 4b will determine the image based upon the manner in which light is modulated through the liquid crystal layer 4b. In most embodiments described herein, a nematic liquid crystal which is capable of modifying the polarized state of light is assumed to be the light modulating medium used in the reflective display device. It will be appreciated that numerous other light modulating media may be employed, such as ferro-electric liquid crystals and other types of electro-optical layers which may modulate light in a manner to spatially create an image on a reflective display device.

The modulated light from the reflective display device 4 is directed toward the beamsplitter 9 and passes through the beamsplitter toward the viewing optic lens 5 which creates a magnified image which is a virtual image of the image on the reflective display device 4. The overall path of light from the illuminator 6 to the reflective device 4 and then to the viewing optic lens 5 is shown by the path 10 in FIG. 1B. A scan converter integrated circuit 8 is also shown in FIG. 1B, and this circuit provides parallel to serial conversion in order to generate a serial stream of the various color components which make up the RGB composite pixel image. The data for each of these color components is provided in series and in tandem with the corresponding color LED from the illuminator 6. This is also described in further detail below.

The entire set of components shown in FIG. 1B may be included in a small, lightweight mounting which is mounted in front of the viewer's eye 3 in close proximity to the eye. For example, the head-mounted display 1 may be mounted within approximately 1 inch of the viewer's eye and may be housed in a housing which is approximately a 2 inch cube. It will be appreciated that other alternative embodiments may be constructed according to the present description.

Figure 1C:
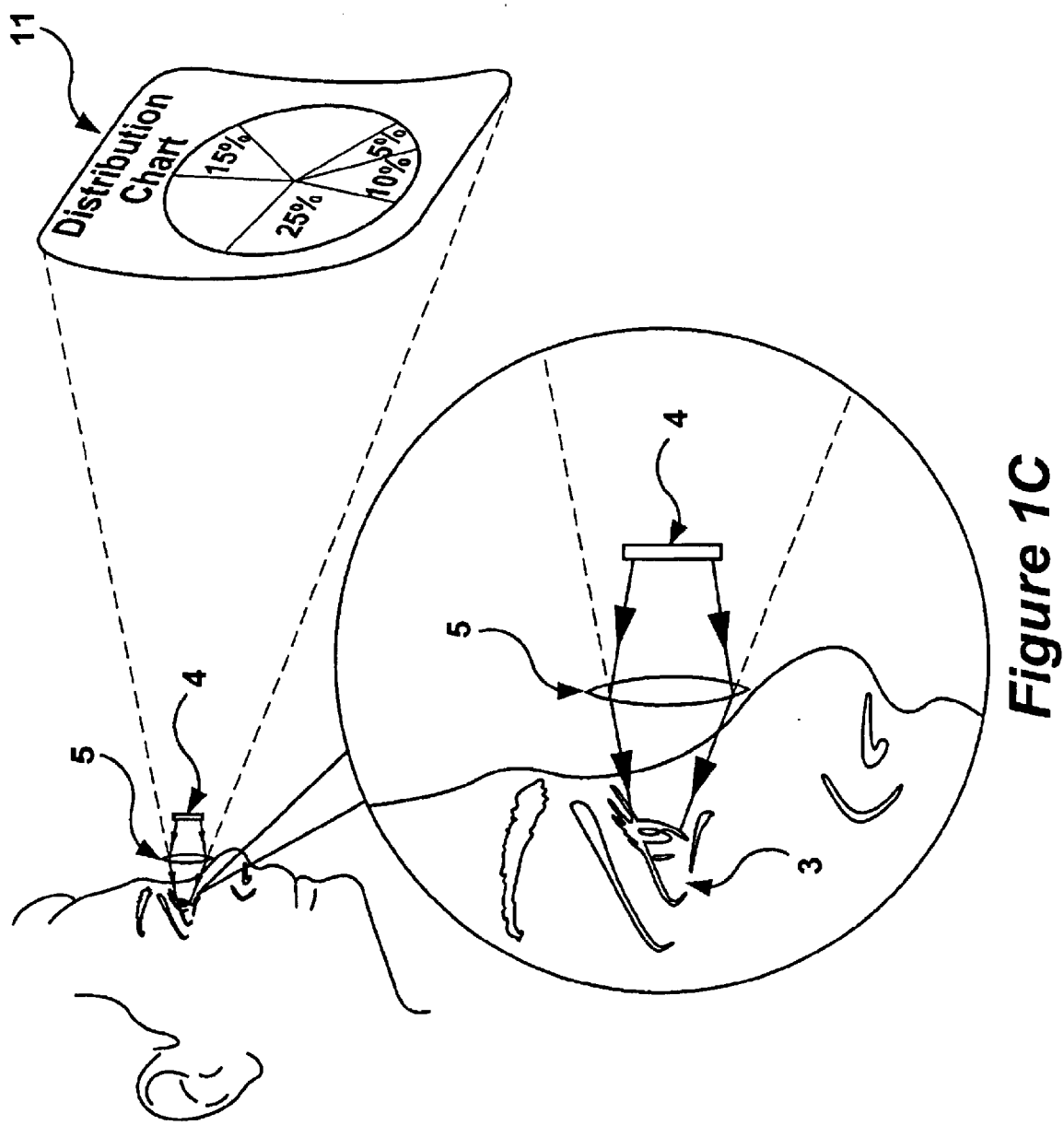
FIG. 1C shows a virtual image 11 created by a head-mounted display according to the present invention.

FIG. 1C shows a virtual image 11 which is created by a head-mounted display according to the present invention, such as the head-mounted display 1 of FIG. 1B. The reflective display device 4 creates the initial image which is then magnified by the magnifying lens 5 to create a virtual image 11 which is viewed by the viewer through the viewer's eye 3.

Figure 2A:
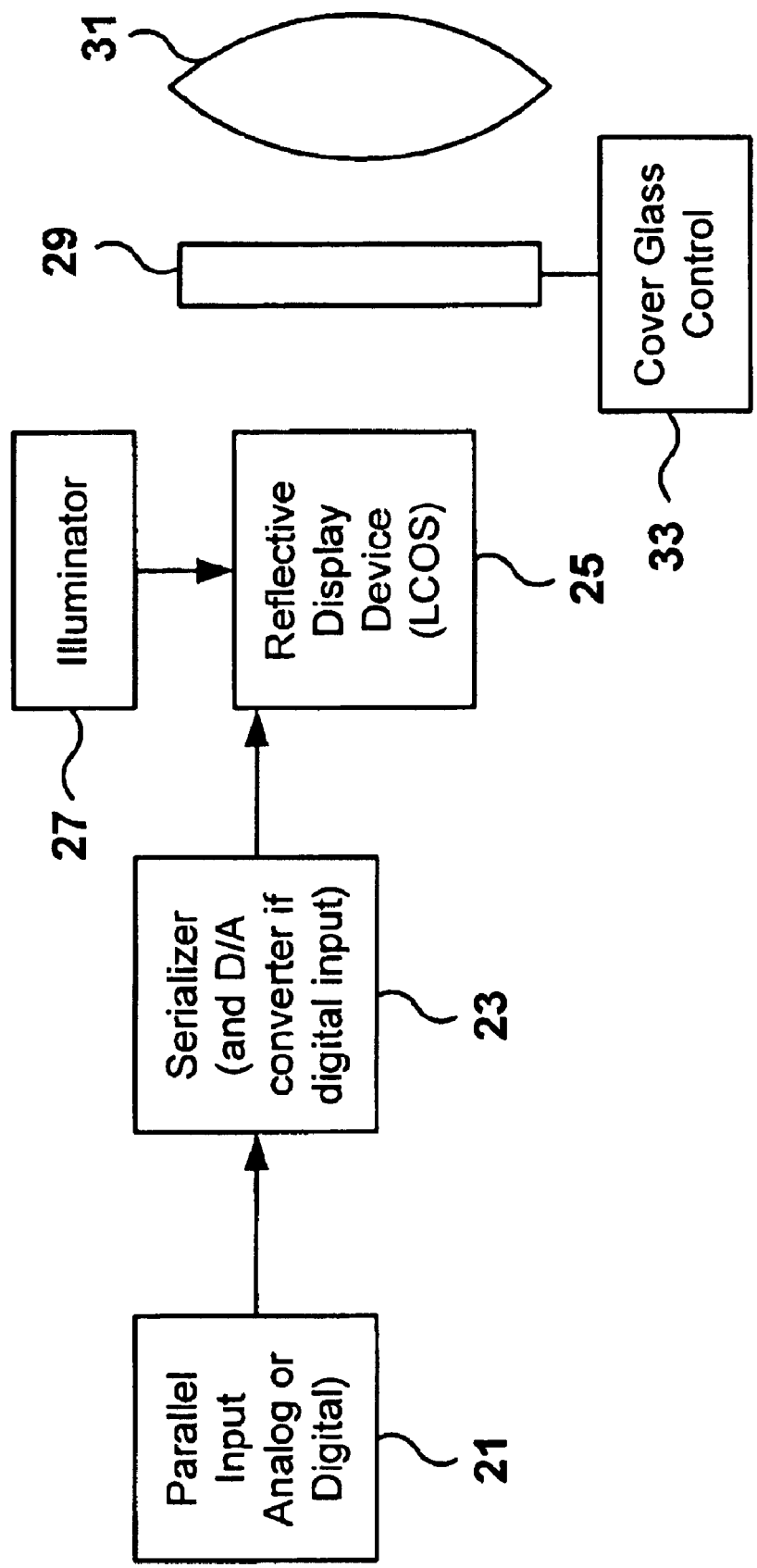
FIG. 2A is a block diagram showing various components of one embodiment of a head-mounted display according to the present invention.

A preferred embodiment of a head-mounted display of the present invention includes a parallel to serial converter which serializes a parallel input of color pixel data. For example, if the parallel color input for a pixel includes three color component values such as red, green, and blue (referred to as "RGB"), then the parallel to serial converter creates a serial stream of red, green, and blue of the color components which are then provided to the reflective display device of the present invention. An example of such a system is shown in FIG. 2A, wherein the serializer 23 converts the parallel input 21 into a serial stream which is provided to the reflective display device 25. It will be appreciated that the parallel input may be either analog or digital. In the preferred embodiment, the reflective display device 25 receives and displays analog pixel data, and therefore if the parallel input 21 is digital, then the serializer 23 will also include a digital to analog (D/A) converter in order to convert the digital information into analog form. This analog information is then provided to pixel electrodes on the reflective display device which cause a light modulating medium, such as a liquid crystal layer, to create an image from the light provided by illuminator 27. In certain preferred embodiments, a cover glass 29 receives a modulated voltage from cover glass control 33 in order to drive the light modulating medium to a state in which display data is substantially not viewable. The modulation of a cover glass electrode voltage is further described in co-pending U.S. patent application Ser. No. 08/801,994, which was filed Feb. 18, 1997, and is entitled "Display System Having Electrode Modulation to Alter a State of an Electro-Optic Layer," which application is hereby incorporated herein by reference. The image created by the reflective display device 25 is then magnified by the magnifying lens 31 which creates a virtual image which is viewed by the viewer's eye. Even though it is the virtual image which is viewed, one may consider that the reflective display device itself is being directly viewed by the viewer.

Figure 2B:
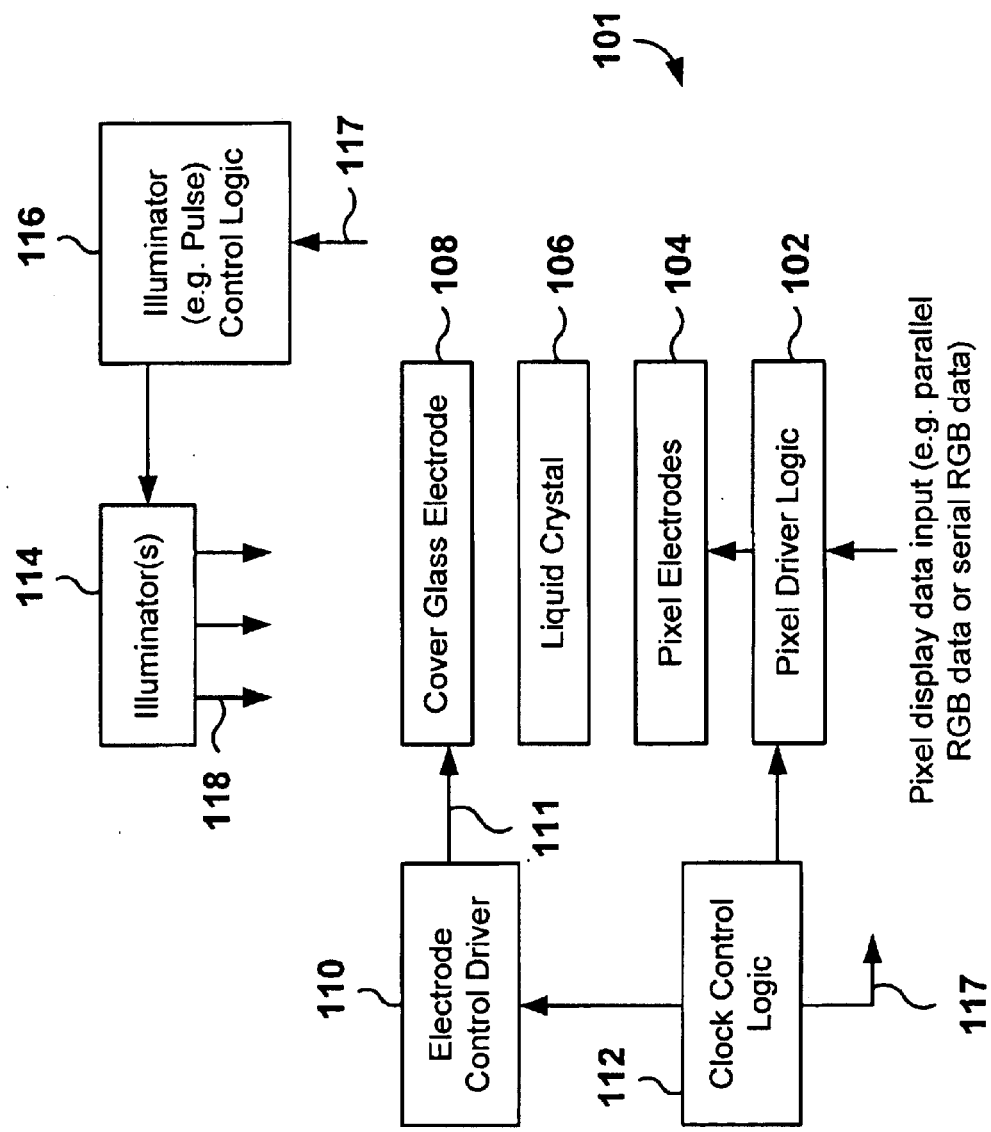
FIG. 2B illustrates various electrical and electro-optical components of a particular embodiment of a head-mounted display according to the present invention.

The reflective display device in one embodiment of the present invention is further shown in FIG. 2B. The display system 101 of FIG. 2A employs a reflective type liquid crystal on silicon display system which includes a pixel driver logic 102, pixel electrodes 104 which are typically arranged in a array that form a grid of mirrors on an upper surface of an integrated circuit such as the CMOS integrated circuit. Also included in the display system 101 is a liquid crystal layer 106 which is typically a nematic liquid crystal layer, but other types of light modulating media may be employed, such as ferro-electric liquid crystals. A cover glass electrode 108 is typically an electrode coating layer applied to a cover glass. A transparent electrode coating and alignment layer is typically applied to one side of the cover glass and this cover glass is applied on top of nematic liquid crystal material layer which is itself on top of the CMOS integrated circuit layer. It will be appreciated that numerous types of integrated circuits may be employed for the integrated circuit layer. For example, NMOS or PMOS integrated circuits may alternatively be employed. Typically, the integrated circuit is fabricated on a monocrystalline silicon substrate, such as that described in U.S. Pat. No. 5,426,526, which is hereby incorporated herein by reference.

Each pixel electrode in the group of pixel electrodes 104 is a mirror which provides one pixel in the rectangular array which forms the image on the reflective display device. These pixel electrodes 104 are driven by pixel driver logic 102 which receives the pixel display data which in a preferred embodiment is serial RGB data. However, in an alternative embodiment, the pixel display data input may be parallel RGB data in the case of a spatial color display system which uses a triad of subpixel electrodes. The pixel driver logic 102 receives clock signals from the clock control logic 112 in order to control the writing of pixel data to the pixel electrodes from one frame to the next frame. The electrode control driver 110 controls the cover glass electrode 108 by providing properly modulated control signal waveforms 111 to the cover glass electrode 108. The electrode control driver 110 also receives clock control signals from the clock control logic 112 in order to provide properly timed cover glass control signals as described in the above noted co-pending U.S. Patent Application which is entitled "Display System Having Electrode Modulation to Alter a State of an Electro-Optic Layer."

In the system 101, the illuminator 114 may provide white light in the case of a spatial color display system, or it may provide in a controlled time sequence three different color lights which correspond to the three different color components which make up a particular pixel's color (e.g., a red light, then a green light, and then a blue light, each provided separately over time). The illuminator 114 provides this light 118 through the control of the illuminator control logic 116 which also receives clocking signals or control signals 117 from the clock control logic 112. The clock control logic 112 provides clocking or control signals to the pixel driver logic 102, the electrode control driver 110 and the illuminator control logic 116 in order to coordinate a controlled phase relationship between the control voltage signals applied to the cover glass electrode and the timing of loading and displaying of pixel data onto and through the pixel electrodes 104. Moreover, the control signals 117 coordinate the use of a particular color light relative to the particular color component being displayed on a pixel electrode in the case of a time sequential color display.

Figure 3:
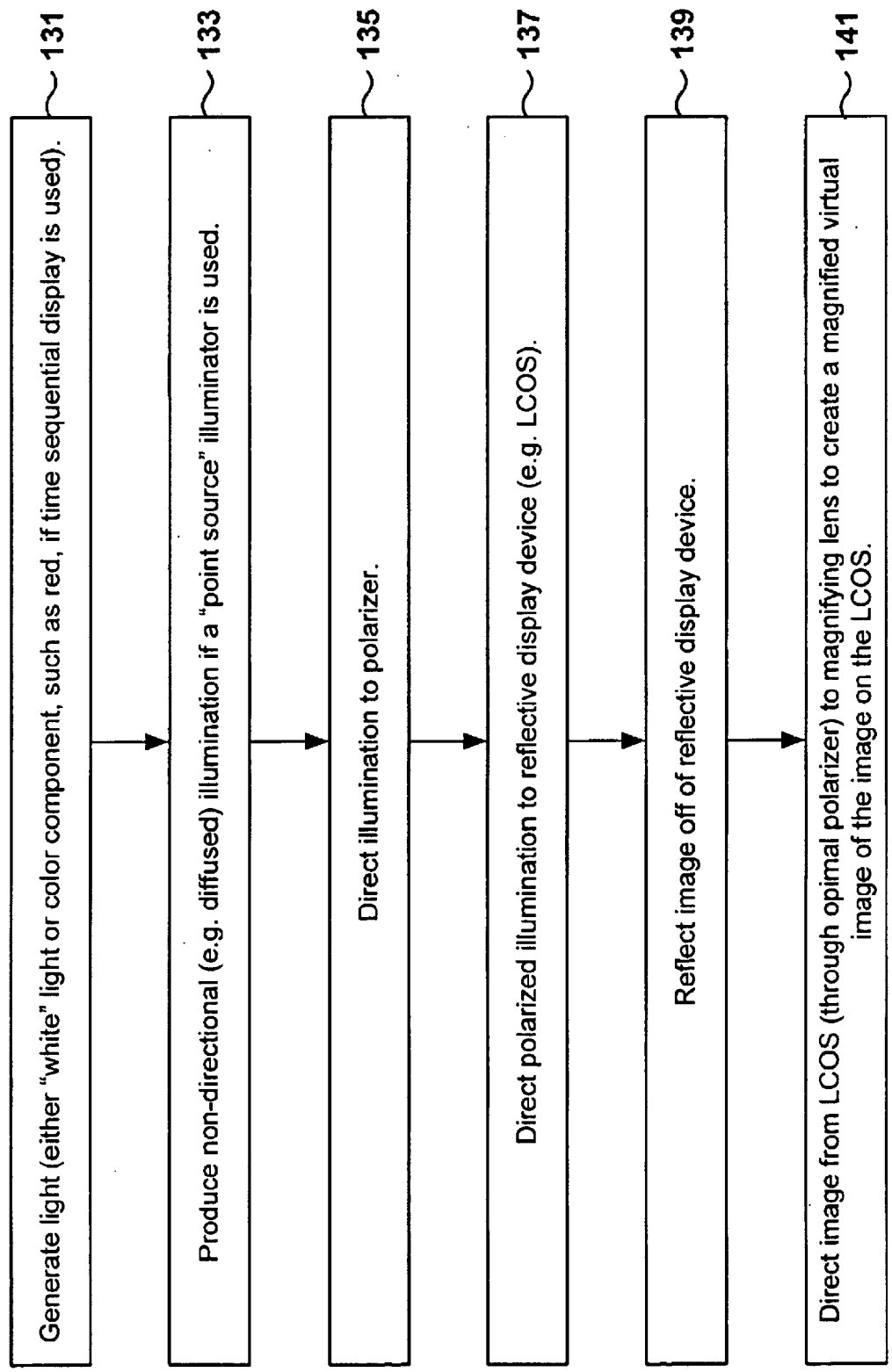
FIG. 3 is a flowchart illustrating a general optical pathway in a head-mounted display according to the present invention.
Figure 4:
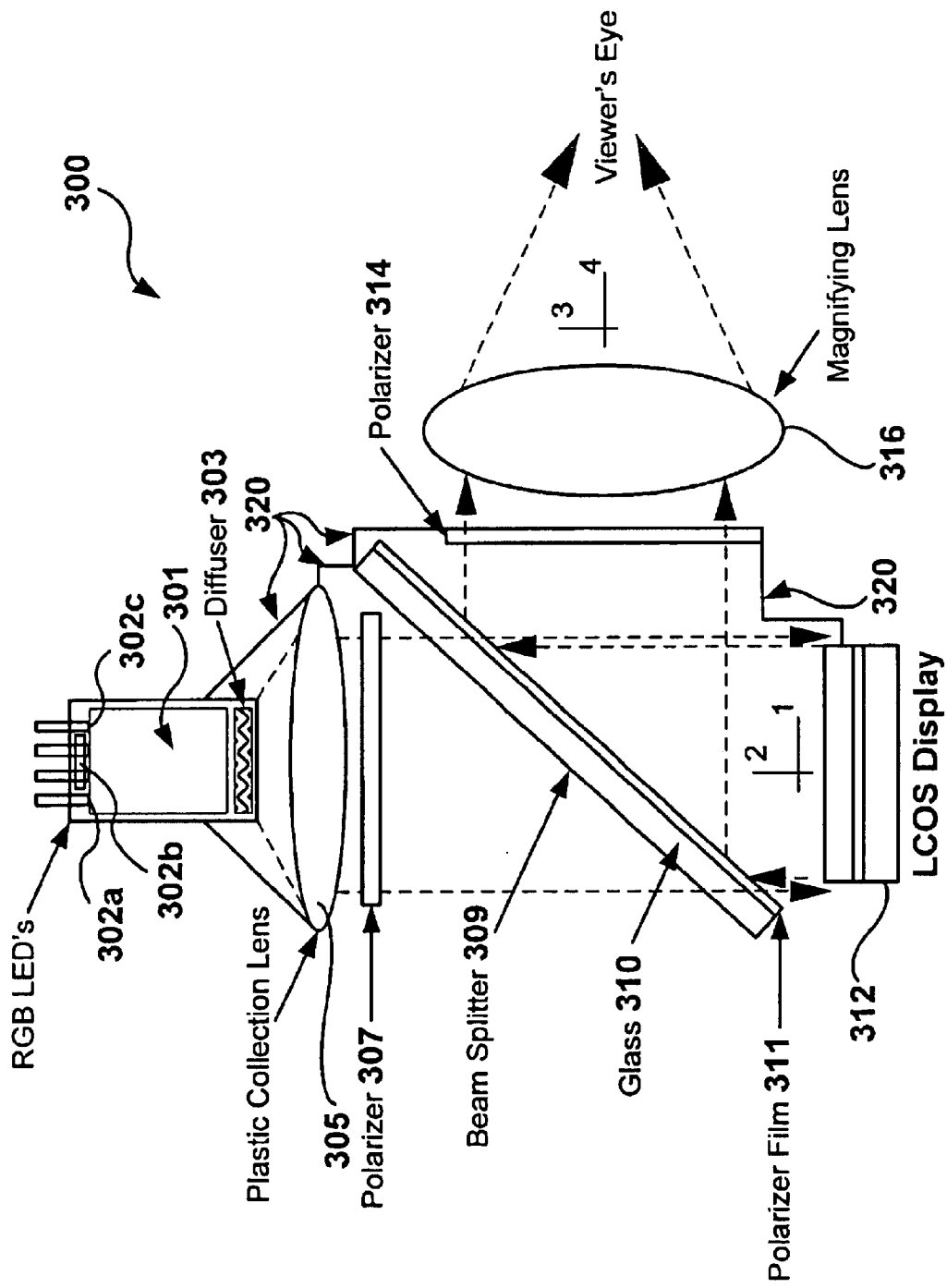
FIG. 4 illustrates an optical configuration for one embodiment of a head-mounted display according to the present invention.

FIG. 3 provides a generalized example of the optical pathway of various embodiments of the head-mounted display of the present invention, including for example, the embodiments shown in FIGS. 1B and 4. The pathway begins by generating light in step 131. This light may be white in the case of a spatial color display system in which each pixel is a plurality of color components, such as a red, green and blue subpixel. Alternatively, the light may be of a single color component, such as red, if a time sequential display is used. In step 133, a more spatially uniform illumination is created, typically by using a diffuser if a "point source" illuminator is used. This illumination is then directed in step 135 to a polarizer, which allows light of only one polarity to pass through. This polarizer is typically the beamsplitter described herein. Then in step 137 the polarized illumination is directed to a miniature reflective display device, such as a LCOS (liquid crystal on silicon) assembly. An image is then reflected off of the reflective display device, and this image is then directed from the LCOS through an optional polarizer to a magnifying lens to create a magnified virtual image of the image on the LCOS.

FIG. 4 illustrates a head-mounted display 300 which includes an illuminator, an LCOS reflective display device 312, and a magnifying lens 316. Three differently colored LED's (light emitting diodes) 302a, 302b, and 302c provide illumination within a box 301. In the case of a time sequential display, the three LED's, red, green and blue, emit light in sequence into the rectangular box, and this light passes through the diffuser 303, which makes the light spatially more uniform. In a typical example of this embodiment, the exit end of the box 301 and also the diffuser 303 has the same length to width ratio as the active display area on the LCOS reflective display device. This ratio often corresponds to the width to height ratio found on cathode ray tubes.

The collection lens 305 magnifies the rectangular light image created by the diffuser 303 to approximately the size of the active display area on the LCOS display. The polarizer 307 in front of the collection lens allows light of only one polarity to pass through. The beamsplitter 309 includes a polarizing film 311, designed according to the present invention, which is polarized in the same direction as the polarizer 307 and thus allows the light from the polarizer 307 to pass through the polarizing film 311 to go towards the LCOS display 312.

The LCOS display 312 creates the image through the liquid crystal layer which acts as a light modulating medium on the mirrored surface created by the rectangular array of pixel electrodes. Typically, at least some of the pixels in the LCOS display 312 will change the polarization of the light reflected from the mirrored surface of the LCOS display such that this light is polarized in the opposite direction to the incident light. For these pixels, the light is now polarized opposite to the film 311 on the beamsplitter 309 and thus most of this light will reflect off of the film toward the magnifying lens 316. For those pixels for which the liquid crystal layer does not change the direction of polarization, the light will tend to pass through the beamsplitter 309 back toward the polarizer 307 rather than being reflected toward the magnifying lens 316. However, any such light which is reflected off the beamsplitter 309 is removed from the viewable image by the polarizer 314 which is polarized in an opposite direction from the polarizing film 311. This polarizer 314 in effect "cleans up" the image by preventing light of undesired polarization from passing through the magnifying lens to the viewer who sees the magnified image of the LCOS display. It will be appreciated that in a typical implementation of the display 300, the polarizer 307 and the polarizing film 311 are aligned such that the polarization directions created by both these polarizers are parallel, but rotated 90° from the polarization direction of the polarizer 314.

The display 300 is typically used in a time sequential display system in which one of the three differently colored LED's is turned on independently. However, a spatial light system may be employed by turning simultaneously on all three LED's to create a substantially white light source.

Figure 5:
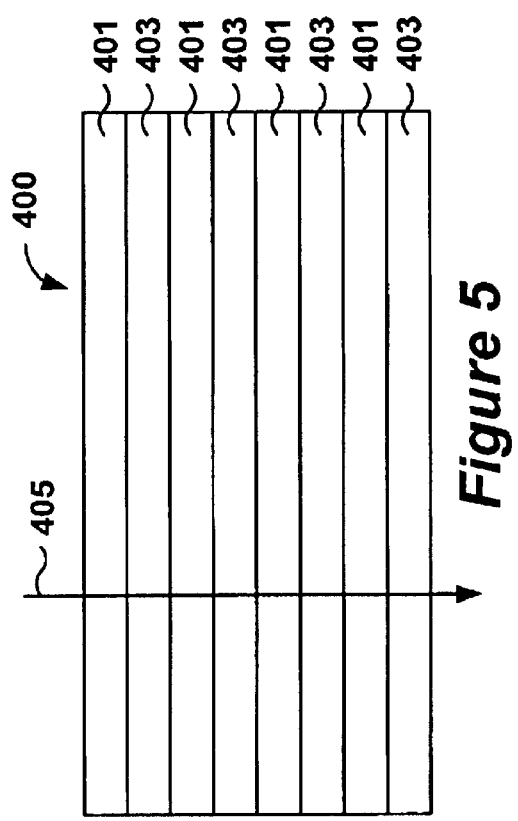
FIG. 5 shows a multilayer film which may be used to create a beamsplitter for a miniature reflective display according to the present invention.
Figure 6:
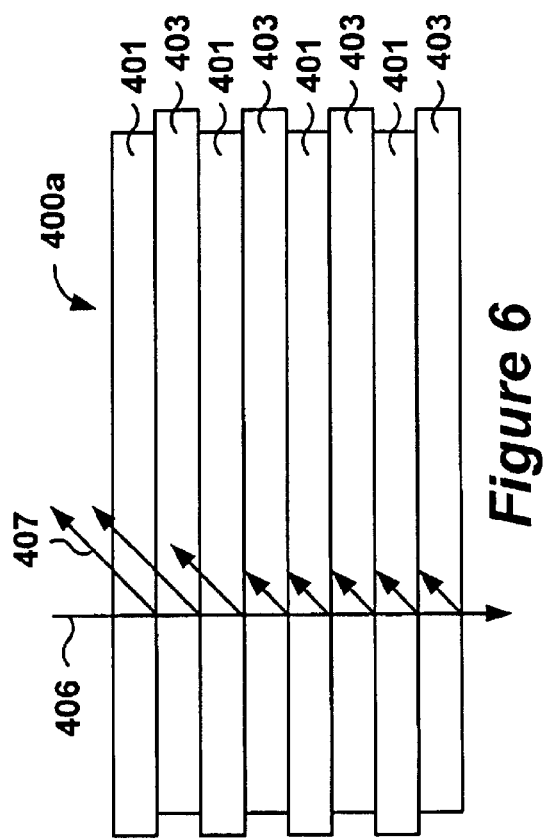
FIG. 6 shows a multilayer film which may be used as a beamsplitter for a miniature reflective display according to the present invention.

Examples of beamsplitters used in various embodiments of the present invention are shown in FIGS. 5 and 6. Conventional beamsplitters have a limited acceptance angle of light and also operate over only a narrow range of wavelengths. Rather than using conventional beamsplitters, certain advantages may be obtained by using a beamsplitter which is made from a material which provides a polarizing beamsplitter having a wide angle of acceptance. An example of such a material is known as DBEF and is manufactured and sold by 3M (Minnesota Mining and Manufacturing Co.). Such material can operate over a wider range of wavelengths and also has a wider angle of acceptance. This allows for the design of more compact miniature display systems which force an optical path to be relatively short. A short optical path often means that light will be incident to a surface at a large variety of angles. Thus, using a beamsplitter as described herein will allow a more compact miniature display system.

FIG. 5 shows an example of unstretched stack 400 of first layers 401 and second layers 403. The stack of first layers and second layers form the film which is the beamsplitter used in accordance with the present invention. A light ray experiences no index of refraction change and passes through the stack. FIG. 6 shows the same stack after having been stretched, thus increasing the index of refraction for the first layers 401 (which now have a higher index of refraction than the second layers 403). Now, part of a light ray 406 will be reflected as reflected light ray 407. By stretching the film uniaxially, the reflected ray 407 will be light of one polarity and the transmitted light which exits the stack 400a will be another polarity. In this manner a polarizing beamsplitter may be formed and used in accordance with the present invention. The materials and fabrication for this multilayer film are also described in the PCT application published as International Publication Number WO97/01774, which is hereby incorporated herein by reference. Another example of a multilayer film which may be used as a beamsplitter in accordance with the present invention is described in U.S. Pat. No. 3,610,729, which is hereby incorporated herein by reference.

Figure 7:
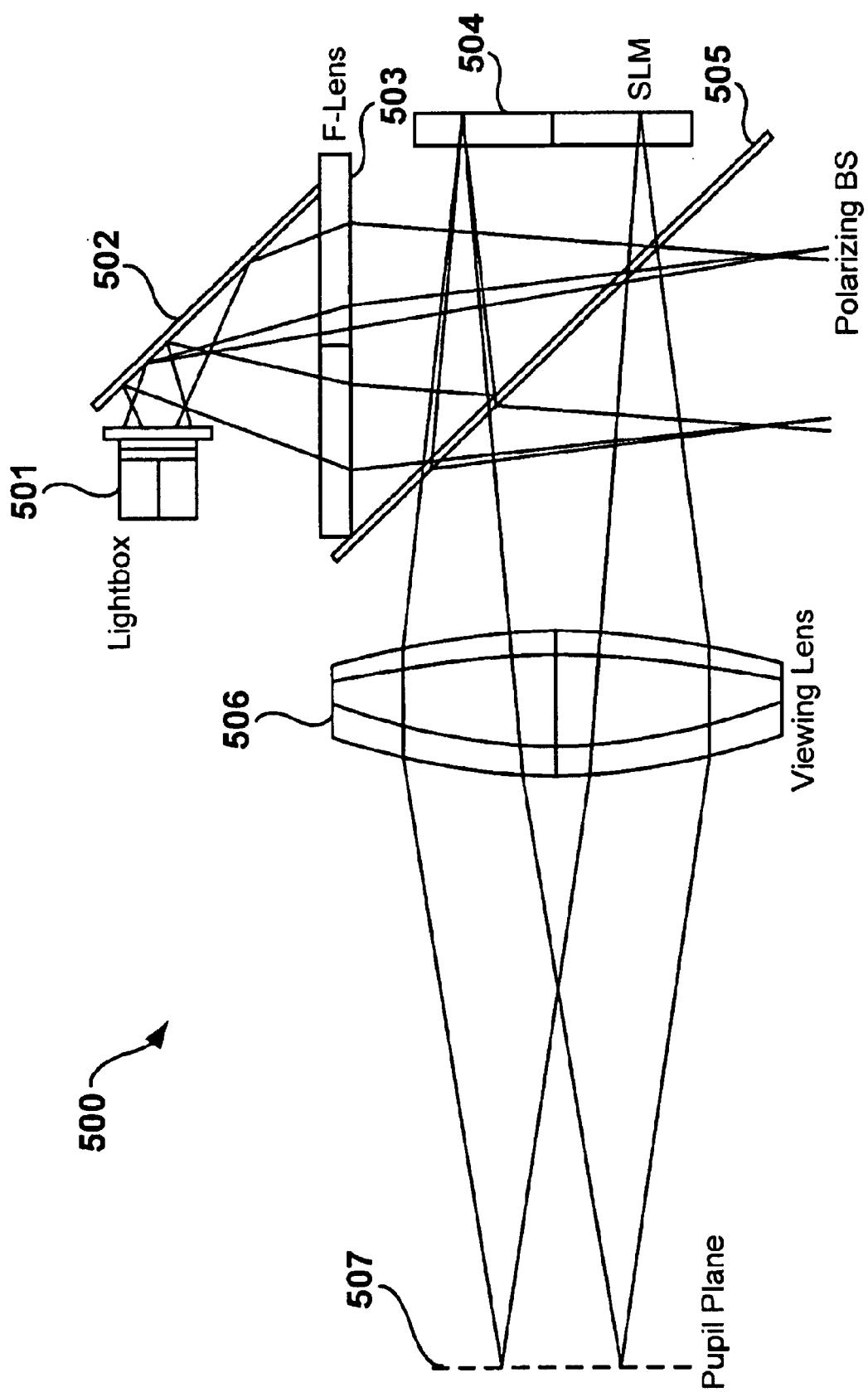
FIG. 7 shows one embodiment of an optical arrangement of a miniature display device which generates an enlarged virtual image.
Figure 8:
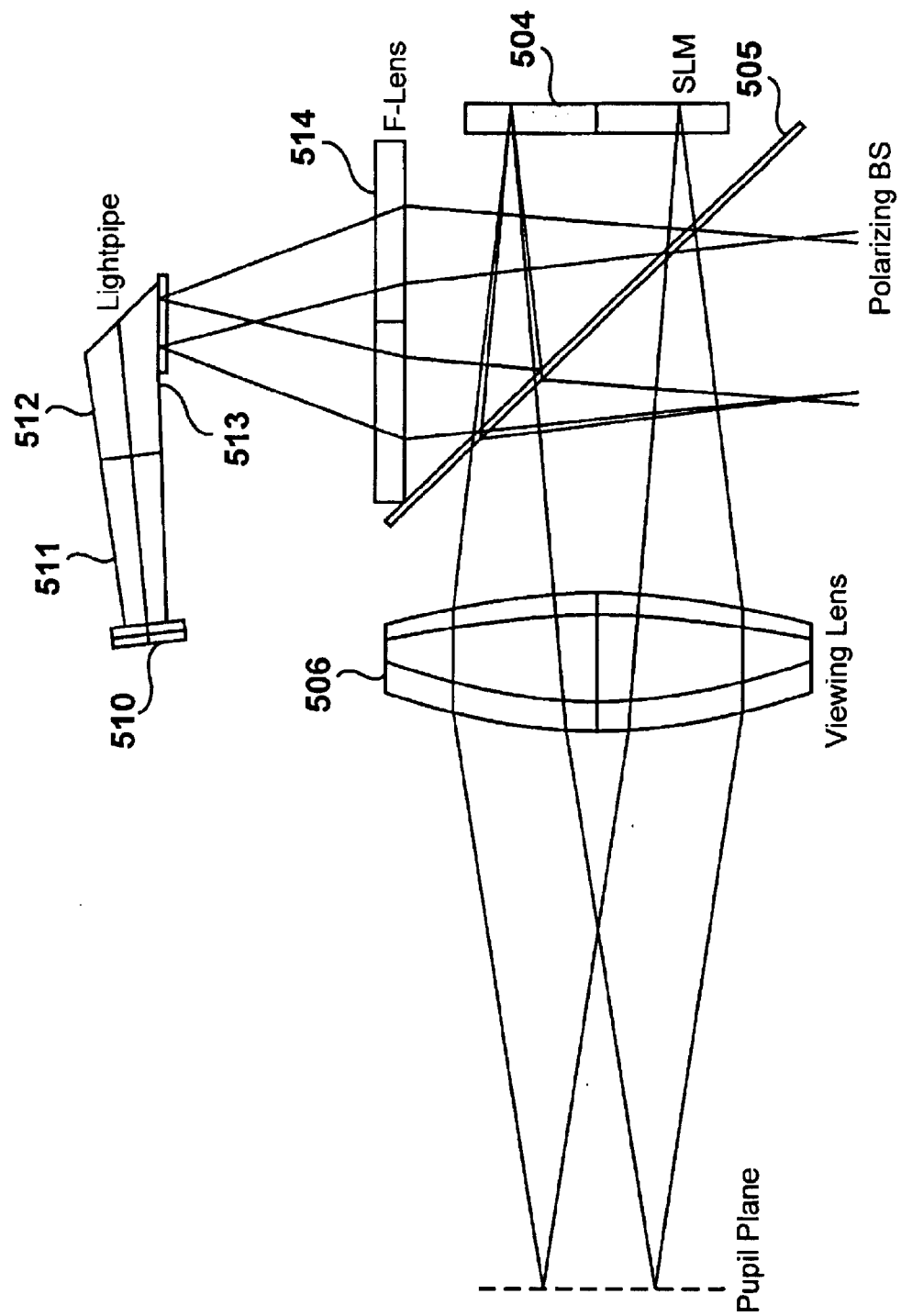
FIG. 8 shows another embodiment according to the present invention of a miniature display device which generates an enlarged virtual image.
Figure 9:
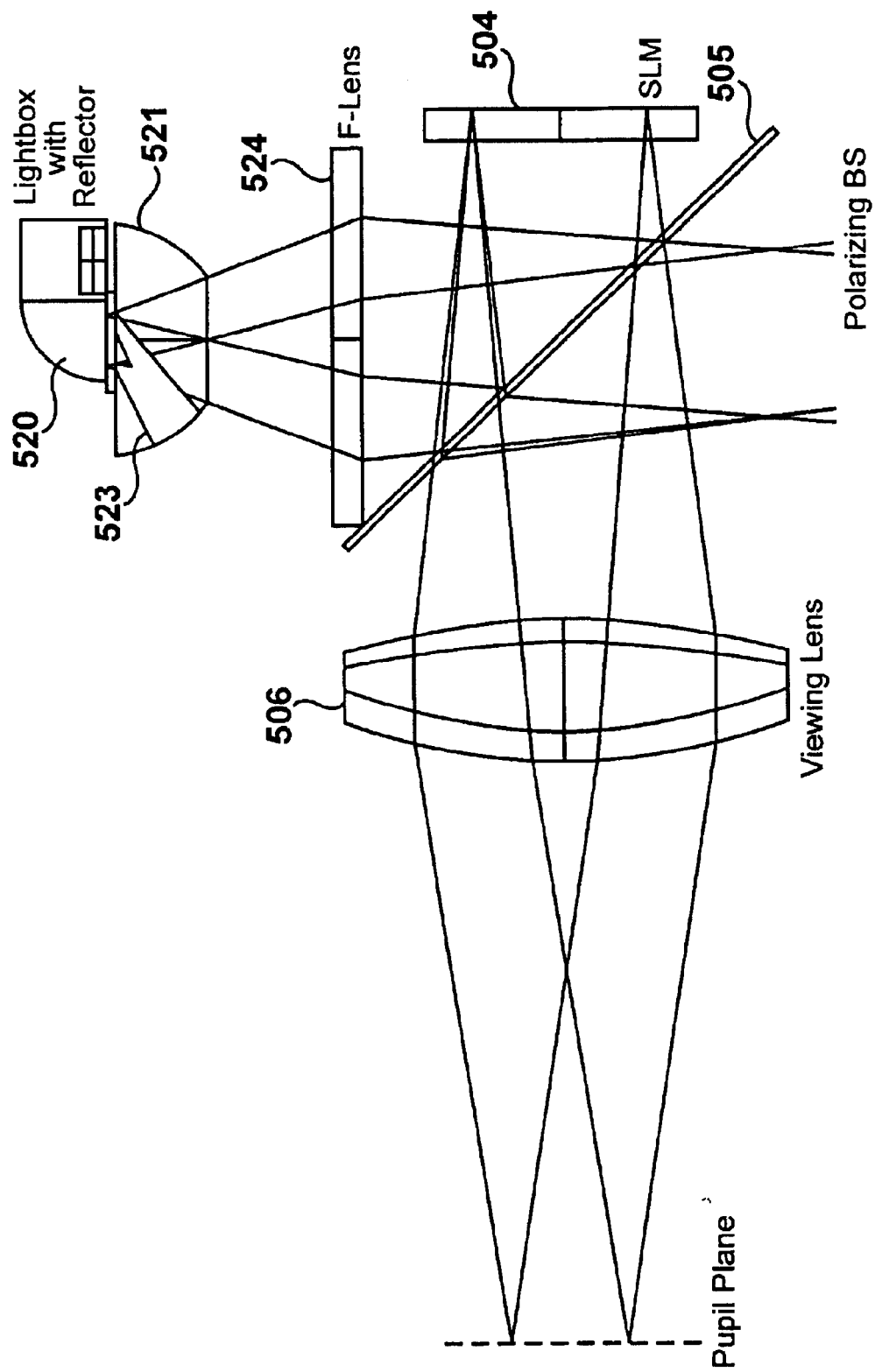
FIG. 9 shows another embodiment according to the present invention of a miniature display device which generates an enlarged virtual image.
Figure 11A:
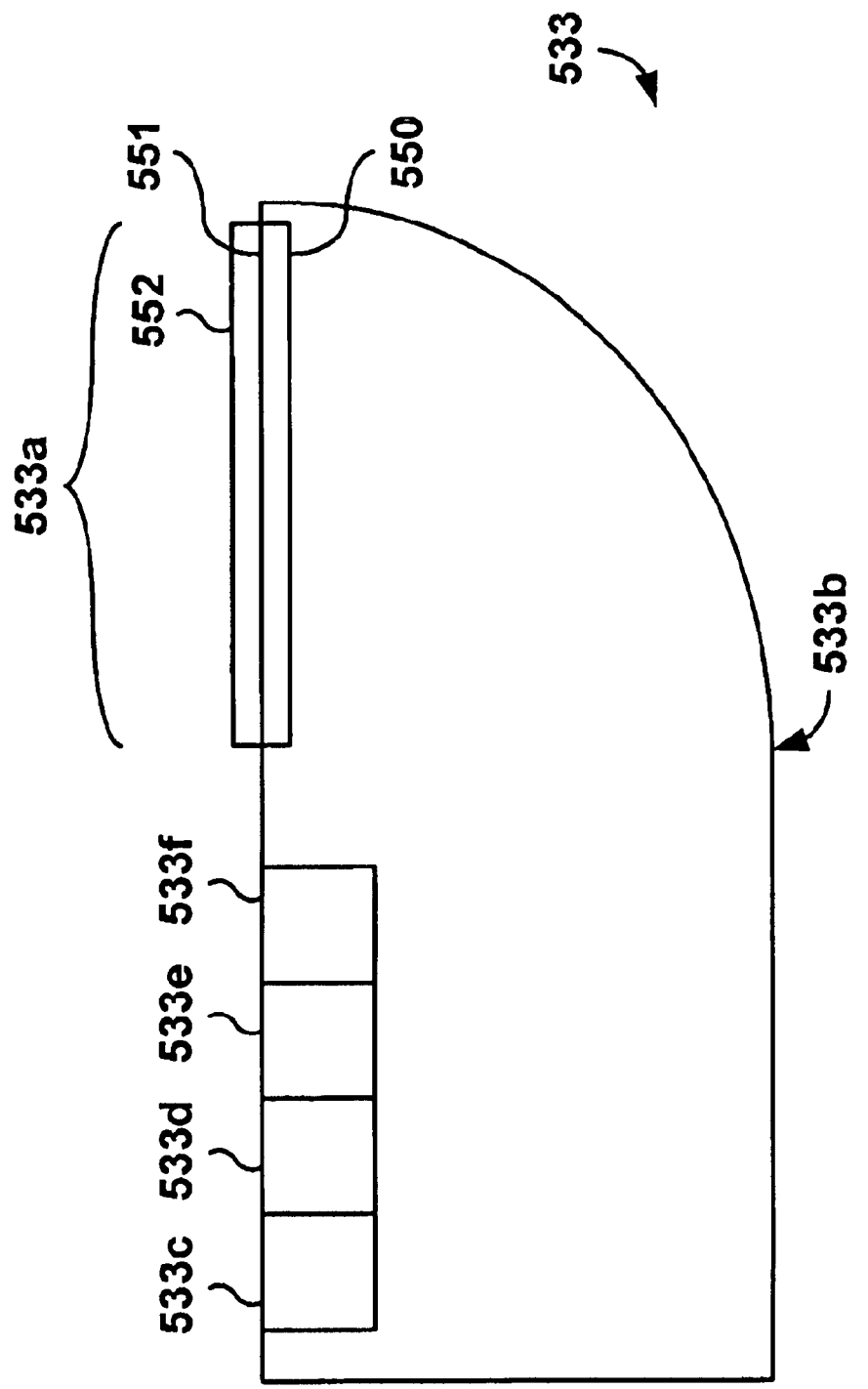
FIG. 11A shows one embodiment of a light source according to one aspect of the present invention.

FIGS. 7, 8, and 9 illustrate another aspect of the present invention in which a fresnel lens is used in combination with a light source to illuminate a spatial light modulator, such as a liquid crystal display device, in order to provide a magnified virtual image of the image on the spatial light modulator. In effect, the output port of the light source is imaged onto the pupil plane 507. The fresnel lens 503 has a low focal length in one embodiment and is used to convert the angular distribution of the light emanating from the output port of the light source into an angular distribution which is better suited for illuminating the SLM, such as a liquid crystal display device. The use of the fresnel lens 503 tends to decrease the overall size of the display device 500 such that the package which contains the display device 500 is relatively small and may be worn on a head-mounted display. The display device 500 includes a light source 501, which may be an integrating cavity type of light source as shown in FIG. 11A. Alternatively, the light source 501 may be other types of light generating illuminators, although the luminance of the output port of the light source should be relatively uniform as a function of angle. A mirror 502 redirects the light from the light source 501 to a fresnel lens 503. This fresnel lens 503 passes the light from the mirror 502 toward the polarizing beamsplitter 505. In one embodiment, the polarizing beamsplitter 505 may be the polarizing beamsplitter shown in FIG. 6, although other polarizing beamsplitters may be used. A non-polarizing beamsplitter may also be used in cases where the light source has a polarizer and a separate analyzer is used between the beamsplitter and the viewing lens. The polarized light from the polarizing beamsplitter 505 is then directed towards the surface of the SLM 504 and the reflected image from this surface is provided back through the beamsplitter 505 and towards the magnifying lens 506, which is alternatively referred to as the viewing lens 506. A virtual image which is enlarged relative to the actual image on the SLM 504 is provided by the viewing lens 506 at the pupil plane 507. The viewer would typically place his/her eye near the pupil plane to see the virtual image.

FIG. 8 shows an alternative optical arrangement for illuminating the SLM 504. In this embodiment, the light source is a light pipe having an illumination generator 510 which generates light and a light pipe portion 511 having mirrored surfaces which reflect the light toward a mirror 512. This mirror 512 in turn reflects light from the light pipe towards an output port 513 which would typically include a diffuser. The light from the output port 513 is directed to and through the fresnel lens 514 which directs the light to the polarizing beamsplitter 505. The remainder of the optical path from the polarizing beamsplitter to the SLM and then through the polarizing beamsplitter 505 and through the viewing lens 506 is the same as for FIG. 7. The light pipe as shown in FIG. 8 is tapered from its input end to its output end so that the collection numerical aperture of the fresnel lens matches the output numerical aperture of the output port 513.

FIG. 9 shows another embodiment of the display device according to one aspect of the present invention. In this embodiment, an integrating cavity light source 520 is used with a curved reflecting element 521 which can be used to send light that exceeds the numerical aperture of the fresnel lens 524 back into the light source. This is shown by the light rays 523 which are emitted from the output aperture of the light source 520 and reflected by the curved reflecting element 521 back into the light source 520. It will be appreciated that the light source 520 may be used without the reflecting element 521 and the light from the light source may be then directed directly to the fresnel lens according to one embodiment of the present invention.

FIGS. 10A–10I show one particular embodiment of the present invention. In this embodiment, a relatively small image generator with its associated optical system creates a virtual image of the image displayed on a display surface 504, which in the preferred embodiment is a type of reflective liquid crystal display device, commonly known as liquid crystal on silicon display device (LCOS). This type of display device is a form of a spatial light modulator. The display 504 creates a miniature image, and this image is illuminated by light from a light box 553 such that light reflecting off of this display 504 generates a virtual image through the viewing lens 531. This virtual image is typically viewed by a viewer placing the viewer's eye in close proximity to the viewing lens. In this manner, a relatively small head-mounted display may be provided. Alternatively, this display device may be used to project an image across a room if a different optical arrangement is provided. The display device shown in FIG. 10A includes a display 504 and a beamsplitter 505, which may be the beamsplitter shown in FIG. 6. The display device shown in FIG. 10A also includes the viewing lens 531 which is similar to the viewing lens 506 and also includes a fresnel lens 530 which is similar to the fresnel lens 503. A light box 533 has an output aperture or output port 533a which illuminates the display 504 by directing light from the output aperture 533a to the mirror 532 which in turn reflects the light through the fresnel lens 530 and toward the beamsplitter 505. This beamsplitter 505 then reflects polarized light towards the display 504 and the reflected image from the pixel electrodes on the display 504 traverses back through the beamsplitter 505 (and an analyzer, if any) and is magnified by the viewing lens 531 to create the virtual image which a user sees. The mirror 532 and the fresnel lens 530 are held by a support member or frame 534. The beamsplitter 505, if it is the polarizing beamsplitter of FIG. 6, is oriented relative to the polarizers (described below) on the light box 533 such that the polarized light from the light box is reflected by the beamsplitter 505 toward the display 504. The display 504 then spatially modulates the light to create an image (causing some of the light to have altered polarities), and this reflected image is projected back to the beamsplitter (and an optional analyzer which may be a film attached to the side of the beamsplitter next to the viewing lens). The beamsplitter (and the optional analyzer) then passes light having a polarization opposite to the light (from the source) which it reflected toward the display 504.

FIG. 10B shows a left side view of the display device shown in FIG. 10A. It will be appreciated that FIG. 10A shows a top view of this display device. A slight tilt of the plane of the output port of the light box 533 can be seen in FIG. 10B. This tilt is relative to an optical axis through both the display 504 and the viewing lens 531. This tilt is provided in one embodiment of the present invention in order to compensate for a slight asymmetry in the angular distribution of the light output from the output port of the light box. As an alternative, the polarizing beamsplitter 505 may be tilted slightly to compensate for this asymmetry. It is also noted that the polarizing films used in the embodiment of the light box shown in FIG. 11A also tend to correct for this slight left to right asymmetry in the angular distribution of light from the output port of the light box.

Figure 10E:
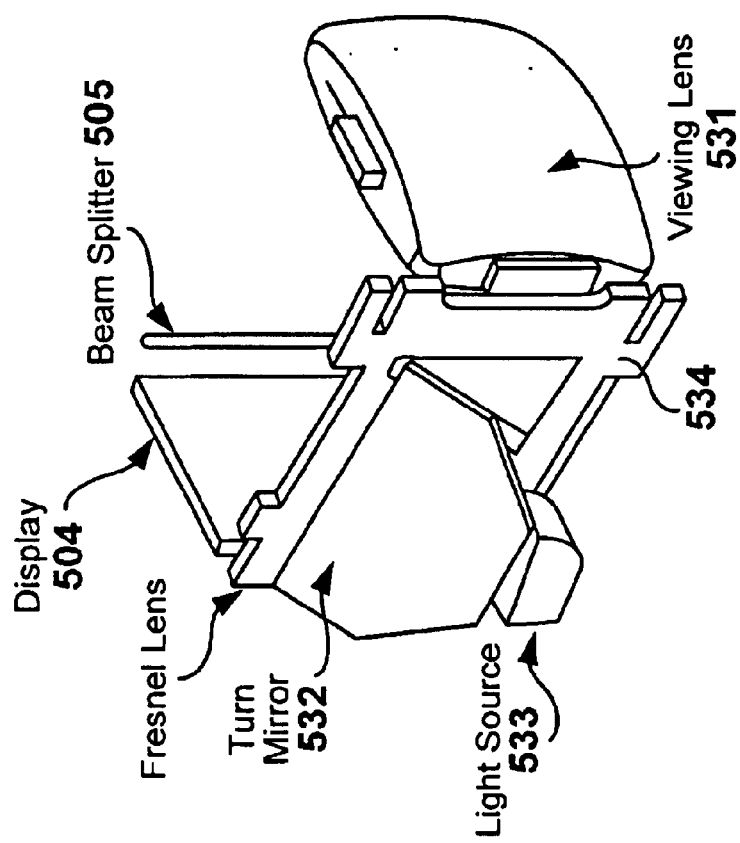
FIG. 10E shows another perspective view partially from the front side of the optical arrangement of FIG. 10A.
Figure 10D:
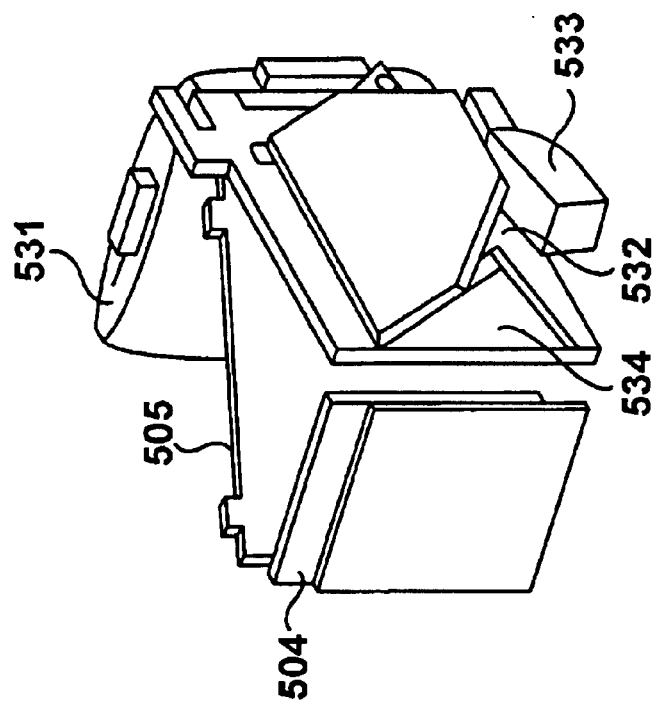
FIG. 10D shows a perspective view, partially from the back side of the optical arrangement shown in FIG. 10A.

FIG. 10C shows a front view of the display device of FIG. 10A. From this view, it can be seen that the mirror 532 slightly overhangs the light source 533 and that the frame 534 includes two angular wings which serve to support the mirror 532. FIG. 10D shows a back perspective view of the display device of FIG. 10A. In this view, the back surface of the display device 504 can be seen relative to the beamsplitter 505 and the viewing lens 531. FIG. 10D also shows the position of the light box 533 relative to the mirror 532 and the frame 534. FIG. 10E shows a front perspective view of the display device of FIG. 10A.

Figure 10F:
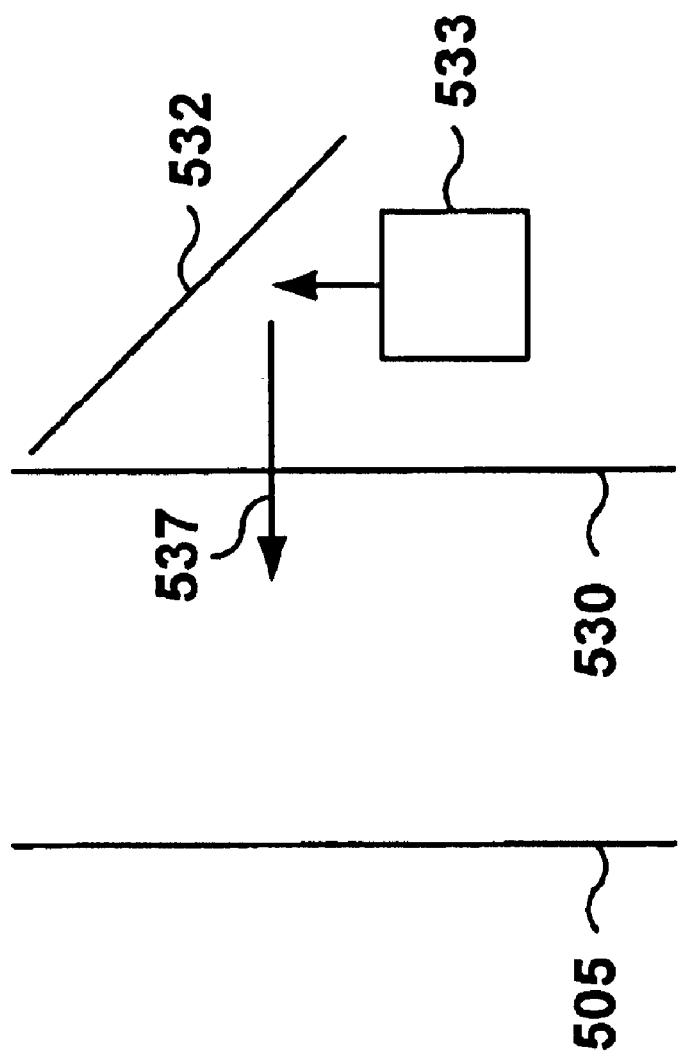
FIG. 10F shows a cross-sectional view of a portion of the optical arrangement of FIG. 10A taken along the line labeled A—A in FIG. 10A.

FIG. 10F shows a cross-sectional view of the display device of FIG. 10A where the cross-section is taken at the line A—A as shown in FIG. 10A. Because this cross-section cuts the beamsplitter 505, this beamsplitter 505 in the view shown in FIG. 10F appears as a single line. This is also true with respect to the fresnel lens 530 and the mirror 532. From the view shown in FIG. 10F, it can be seen that light from the output port of the light box 533 is directed to the mirror 532 and then directed through the fresnel lens 530 as shown by the light path 537. This light is then polarized by the reflecting polarizing beamsplitter 505 such that polarized light is reflected toward the display 504.

FIG. 10G, 10H, and 10I show additional views of the display device of FIG. 10A with additional supporting structures surrounding the device. These figures also show various dimensions of one preferred embodiment of this display device. From FIG. 10G it can be seen that the surface of the display 504 is approximately 22 millimeters from the tangent point of the viewing lens 531. Also, the distance from the face of the display 504 to the optical axis of the fresnel lens 530 is about 9.5 millimeters. The relative positioning of the output port 533a relative to this optical axis can also be seen from the top view provided by FIG. 10G. FIG. 10H shows a left view of the display device of FIG. 10A. From this view, the tilt of approximately 10° of the light box 553 relative to the optical axis of the display 504 can be seen in FIG. 10H. Also, the offset of 3.8 millimeters from one end of the output port 553a to the optical axis of the viewing lens 531 can be seen from FIG. 10H. FIG. 10I shows a front view which again shows relative dimensions of the various optical components. It can be seen that the center line of the light box 533 is approximately 6 millimeters from the face of the fresnel lens 530, and this face of the fresnel lens is also about 8.1 millimeters from the center line of the display 504. All dimensions shown in FIGS. 10G, 10H, and 10I are in millimeters.

FIG. 11A shows one embodiment of a light box 533 according to one aspect of the present invention. The interior of the light box 533 includes a cavity which is lined with a reflective surface 533b which is a high efficiency diffuse reflector, such as teflon or white paint. Examples of such high efficiency diffuse reflectors can also be found in U.S. Pat. Nos. 5,440,197 and 5,684,354. Light from illuminators, such as the LED's 533c, 533d, 533e, and 533f illuminate the walls of the cavity which serve to "integrate" the light and provide the light at the output port 533a. The light box 533 may be used either with a time sequential color system or in a spatial color system in which white light is provided through the output port 533a. The output port 533a includes in this particular embodiment three films which serve to polarize and diffuse the light which is output through the aperture 533a. These films also tend to correct the left to right asymmetry of light output from the output port 533a as shown in FIG. 11A. The film 550 is a diffuser, such as a holographic diffuser which can be obtained from the Physical Optics Corporation. This film serves to further diffuse the light output through the aperture 533a. Film 551 is a DBEF film which may be obtained from 3M as noted above. The film 552 is a linear polarizer oriented in the same direction of polarization as the film 551 in order to achieve light of substantially one polarization as it exits the film 552.

FIGS. 11B, 11C, 11D, and 11E show the particular light box 533 shown in the embodiment of FIGS. 10A–10I. The dimensions shown in FIGS. 11B–11D. are in millimeters.

FIGS. 12A, 12B, 12C, 12D, 12E, 12F and 12G show further details with respect to the fresnel lens 530 shown in FIGS. 10A–10I. This particular fresnel lens 530 serves to change the cone angle of light which illuminates each spot of most of the surface of the display 504. In particular, the fresnel lens 530 of this embodiment provides a more narrow cone of light at each point of most of the surface of the display 504. The narrower cone of light provides better illumination for a liquid crystal on silicon display device which is reflective. The illumination is better in that the pixels on reflective LCOS are illuminated more uniformly across the surface of the reflective LCOS (e.g. the angular cones of illumination are consistently the same from pixel to pixel across the surface), and there is less stray light (e.g. which misses the surface) and the illumination is therefore more efficient.

Figure 13C:
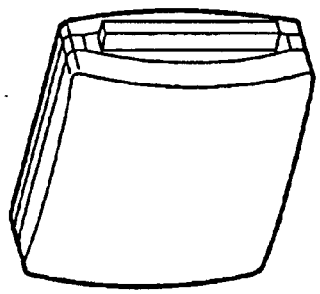
FIGS. 13A, 13B, and 13C respectively show a front, side, and perspective view of an embodiment of the optical element 531 of FIG. 10A.
Figure 13B:
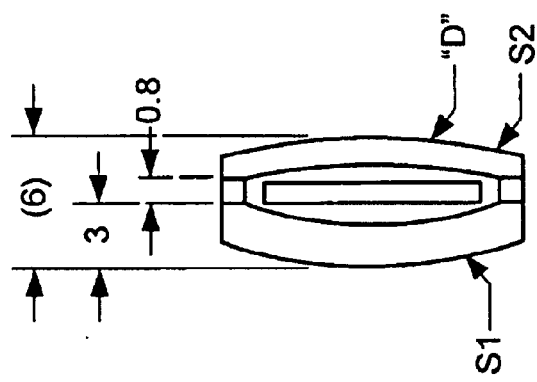
Figure 13A:
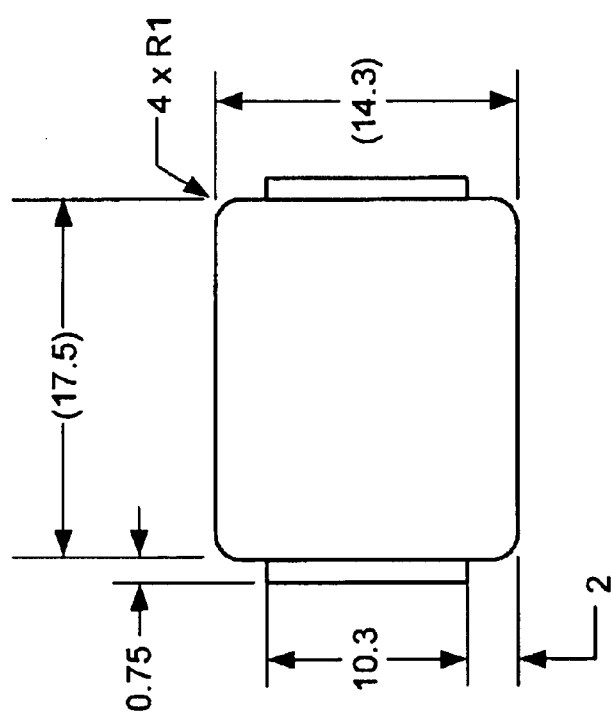

FIGS. 13A, 13B, and 13C shown various views of the viewing lens 531 which is used in the particular embodiment of the display device shown in FIGS. 10A–10I. FIG. 13A shows a front planar view of this lens, while FIG. 13B shows a side view. FIG. 13C shows a perspective view of this viewing lens 531. FIG. 13D shows various parameters and information further specifying this particular viewing lens.

Although only several particular embodiments of the present invention have been described in detail, it should be appreciated that the present invention may be embodied in other forms without departing from the spirit and scope of the present invention. For instance, polarizing beamsplitting film may be used with transmissive miniature display devices. Furthermore, other illumination systems may be employed such as laser diodes, cold cathode or field emitter cathodoluminescent sources. Also, various display systems may be implemented with utilize spatial display systems rather than time sequential display systems and these spatial display systems may be used with what may be referred to as cover glass modulation (cover glass modulation is described in co-pending U.S. patent application Ser. No. 08/801,994, filed Feb. 18, 1997, which is hereby incorporated herein by reference and is also described in co-pending U.S. patent application Ser. No. 08/770,233, filed Dec. 19, 1996, which is also hereby incorporated herein by reference). Moreover, in each instance, pixel buffering (described in application Ser. No. 08/770,233) may or may not be used. Also, there are numerous alternative optical configurations which may be used with a miniature display device and beamsplitter combination in accordance with the present invention. For example, U.S. Pat. No. 5,596,451 illustrates many different such alternative optical configurations which may be used in accordance with the present invention. Thus, rather than using a conventional beamsplitter in these alternative optical configurations, a beamsplitter as described herein may be used.

What is claimed is:

1. An image generator for producing a visual display, said image generator comprising:

an illuminator which generates a source of light;

a miniature reflective display device which includes a light modulating medium and a reflective surface, said reflective surface reflecting light from said source of light, said light modulating medium forming an image by spatially modulating light in said light modulating medium;

a beamsplitter optically coupled to said reflective display device to produce a virtual image for said visual display, wherein said beamsplitter is a reflective polarizer which polarizes by reflecting light having a first polarization component and transmitting light having a second polarization component and comprises a film having a plurality of layers including at least a first layer comprising an oriented birefringent material, said beamsplitter having a wide angle of acceptance wherein said beamsplitter further comprises an analyzer attached to said beamsplitter, and wherein said beamsplitter is at an angle, relative to said miniature reflective display device, which is substantially not equal to zero.

2. An image generator as in claim 1 wherein said image generator is a miniature image generator for relatively small, lightweight head-mounted display and wherein said visual image is viewed by a viewer.

3. Am image generator as in claim 2 further comprising a parallel to serial converter which receives data representing said image and which serializes said data into a serial stream of color components and wherein said parallel to serial converter is coupled to said reflective display device, and wherein said illuminator comprises a plurality of illumination sources each corresponding to one of said color components.

4. An image generator as in claim 1 wherein said film has been stretched along a first axis in a plane of said film, and wherein said film has a second dimension along a second axis in said plane, said second axis being generally orthogonal to said first axis.

5. An image generator as in claim 3 wherein said illuminator comprises a red LED, a green LED and a blue LED and wherein said serial stream of color components comprises a corresponding red color component, wherein a colored point in said image is represented by the accumulated display of said serial stream of color components.

6. An image generator as in claim 3 wherein said illuminator comprises a red LED, a green LED, and a blue LED all contained within a mirrored chamber having an exit window, wherein a length and a width of said exit window substantially matches a length and a width of said image on said reflective surface.

7. Am image generator as in claim 4 wherein the amount of stretch along said first axis is at least twice said second dimension.

8. An image generator as in claim 7 wherein said plurality of layers comprises a plurality of first layers and a plurality of second layers, and wherein each first layer has a higher index of refraction associated with at least one axis in said plane than an index of refraction of each second layer.

9. An image generator as in claim 8 wherein said reflective display device is a liquid crystal on silicon reflective type display device.

10. An image generator as in claim 1 wherein said reflective display device has a first axis which is parallel with and defined by said reflective surface which is substantially planar and wherein said first axis is perpendicular to a second axis;

wherein a magnifying lens faces said reflective surface and has a third axis which is parallel to said first axis and has a fourth axis which is perpendicular to said third axis, and wherein said magnifying lens provides light through said magnifying lens substantially parallel to the fourth axis.

11. An image generator as in claim 10 wherein said illuminator has a fifth axis which is defined by one of a substantially planar reflective surface of said illuminator or a light emitting surface of said illuminator, said illuminator projecting light substantially along a direction which is perpendicular to said fifth axis.

12. An image generator as in claim 11 wherein said beamsplitter is disposed in an optical pathway from said reflective display device to said magnifying lens, said beamsplitter receiving light from said illuminator and projecting said light toward said reflective display device which reflects said image back through said beamsplitter to said magnifying lens substantially along the fourth axis.

13. An image generator as in claim 12 wherein said film has been stretched along a first axis in a plane of said film, and wherein said film has a second dimension along a second axis in said plane, said second axis being generally orthogonal to said first axis.

14. An image generator as in claim 13 wherein the amount of stretch along said first axis is at least twice said second dimension.

15. An image generator as in claim 14 further comprising a parallel to serial converter which receives data representing said image and which serializes said data into a serial stream of color components and wherein said parallel to serial converter is coupled to said reflective display device, and wherein said illuminator comprises a plurality of illumination sources, each corresponding to one of said color components.

16. An image generator as in claim 14 wherein said plurality of layers comprises a plurality of first layers and a plurality of second layers, and wherein each first layer has a higher index of refraction associated with at least one axis in said plane than an index of refraction of each second layer.

17. An image generator as in claim 2 wherein said reflective display device comprises a liquid crystal in silicon device having an integrated circuit which comprises a plurality of pixel electrodes which provide said reflective surface.

18. An image generator as in claim 1 wherein said reflective display device has a first axis which is parallel with and defined by said reflective surface which is substantially planar and wherein said first axis is perpendicular to a second axis;

wherein a magnifying lens has a third axis which is parallel to said second axis and has a fourth axis which is perpendicular to said third axis, and wherein said magnifying lens provides light through said magnifying lens substantially parallel of the fourth axis.

19. An image generator as in claim 18 wherein said illuminator has a fifth axis which is defined by and is parallel with a substantially planar light emitting surface, said illuminator projecting light substantially along a direction which is perpendicular to said fifth axis, and wherein said direction is parallel with said third axis.

20. An image generator as in claim 19 wherein said beamsplitter is disposed in an optical pathway from said reflective display to said magnifying lens, said beamsplitter passing light from said illuminator to said reflective display device and reflecting light from said reflective display device to said magnifying lens.

21. An image generator as in claim 2 wherein said illuminator comprises a red LED, a green LED, and a blue LED which are disposed orthogonally relative to each other and are disposed to provide light to a beamsplitter in an illuminator housing which has an exit window.

22. An image generator as in claim 20 wherein said film has been stretched along a first axis in a plane of said film, and wherein said film has a second dimension along a second axis in said plane, said second axis being generally orthogonal to said first axis.

23. An image generator as in claim 22 wherein the amount of stretch along said first axis is at least twice said second dimension.

24. An image generator as in claim 23 wherein said plurality of layers comprises a plurality of first layers and a plurality of second layers, and wherein each first layer has a higher index of refraction associated with at least one axis in said plane than an index of refraction of each second layer.

25. An image generator as in claim 24 further comprising a parallel to serial converter which receives data representing said image and which serializes said data into a serial stream of color components and wherein said parallel to serial converter is coupled to said reflective display device, and wherein said illuminator comprises a plurality of illumination sources, each corresponding to one of said color components.

26. An image generator as in claim 2 wherein said first layer has an average thickness of less than about 0.5 microns and wherein said plurality of layers comprises a second layer having an average thickness of less than about 0.5 microns.

27. An image generator as in claim 26 wherein said first layer comprises a crystalline aromatic dicarbozylic acid.

28. An image generator as in claim 27 wherein said first layer comprises a crystalline naphthalene dicarboxylic acid polyester.

29. An image generator as in claim 1 wherein said analyzer is a film.

30. An image generator as in claim 29 wherein said angle is approximately 45°.

31. An image generator for producing a visual display, said image generator comprising:
    an illuminator which generates a source of light;
    a miniature display device which includes a light modulating medium which produces a miniature image by spatially modulating light in said light modulating medium;
    a beamsplitter optically coupled to said miniature display device to produce a magnified image for said visual display, wherein said beamsplitter is a reflective polarizer which polarizes by reflecting light having a first polarization component and transmitting light having a second polarization component and comprises a film having a plurality of layers including at least a first layer comprising an oriented birefringent material, said beamsplitter having a wide angle of acceptance wherein said beamsplitter further comprises an analyzer attached to so said beamsplitter, and wherein said beamsplitter is at an angle, relative to said miniature display device, which is substantially not equal to zero.

32. An image generator as in claim 31 wherein said film has been stretched along a first axis in a plane of said film, and wherein said film has a second dimension along a second axis in said plane, said second axis being generally orthogonal to said first axis.

33. An image generator as in claim 32 wherein the amount of stretch along said first axis is at least twice said second dimension.

34. An image generator as in claim 33 wherein said plurality of layers comprises a plurality of first layers and a plurality of second layers, and wherein each first layer has a higher index of refraction associated with at least one axis in said plane than an index of refraction of each second layer.

35. An image generator as in claim 30 wherein said analyzer is a film.

36. An image generator as in claim 35 wherein said angle is approximately 45°.

* * * * *